(12) United States Patent
Englund et al.

(10) Patent No.: US 7,469,885 B2
(45) Date of Patent: Dec. 30, 2008

(54) COMPLIANT COUPLING FORCE CONTROL SYSTEM

(75) Inventors: Norman J. Englund, Seattle, WA (US); John S. Finigan, Edgewood, WA (US)

(73) Assignee: The Boeing Company, Chicago, IL (US)

( * ) Notice: Subject to any disclaimer, the term of this patent is extended or adjusted under 35 U.S.C. 154(b) by 127 days.

(21) Appl. No.: 11/257,211

(22) Filed: Oct. 24, 2005

(65) Prior Publication Data
US 2007/0089533 A1   Apr. 26, 2007

(51) Int. Cl.
*F16F 1/10* (2006.01)
(52) U.S. Cl. ............ 267/156; 267/136; 73/862.01; 73/862.381
(58) Field of Classification Search ............ 60/368, 60/393, 464; 73/862.01, 862.381; 267/136, 267/166.1, 179, 154, 156; 177/184, 189
See application file for complete search history.

(56) References Cited

U.S. PATENT DOCUMENTS

| | | | | |
|---|---|---|---|---|
| 1,349,332 A * | 8/1920 | Edwards | | 267/288 |
| 1,923,441 A * | 8/1933 | Kass et al. | | 105/10 |
| 2,390,937 A * | 12/1945 | Holland | | 29/896.9 |
| 2,649,298 A * | 8/1953 | Wulff et al. | | 267/166.1 |
| 3,367,454 A * | 2/1968 | Scherer et al. | | 188/280 |
| 3,373,855 A | 3/1968 | Ericson | | |
| 4,505,458 A * | 3/1985 | Schultz | | 267/209 |
| 5,226,675 A * | 7/1993 | Noah et al. | | 280/439 |
| 5,302,008 A * | 4/1994 | Miyake et al. | | 303/14 |
| 5,558,317 A | 9/1996 | Nels | | |
| 5,878,998 A * | 3/1999 | Hsieh | | 267/166.1 |
| 6,196,514 B1 | 3/2001 | Kienholz | | |
| 6,494,039 B2 * | 12/2002 | Pratt et al. | | 60/368 |
| 2003/0132726 A1 | 7/2003 | Dohring | | |
| 2004/0089988 A1* | 5/2004 | Scott et al. | | 267/140.11 |
| 2007/0051181 A1* | 3/2007 | Bohr | | 73/774 |

(Continued)

OTHER PUBLICATIONS

Samy et al. "Linear Piston Actuators" CCI, 21st AOV Users' Group Conference, Winter 2002, Jan. 9-11. Accessed online Sep. 10, 2007, <http://www.ccivalve.com/pdf/521.pdf>.*

(Continued)

*Primary Examiner*—Pam Rodriguez
(74) *Attorney, Agent, or Firm*—Ostrager Chong Flaherty & Broitman P.C.

(57) ABSTRACT

A force compliant mechanism (750) for a force control system (600) includes a housing (752). A force compliant volute spring member (754) that has an input end (790) and an output end (792) is disposed within the housing (752). A force actuator input shaft (798) operates in response to a force induced thereon. An output shaft (800) is coupled to the output end (792) and to a test object (802). A force transducer (780) is in operative coupling with the force actuator input shaft (798) and generates a force signal in response to the induced force. A method of reducing force transients and increasing stability within a force control system (660) includes applying a force on a test object (666). A force actuator (669) is decoupled from the test object (666). The overall stiffness of the force control system is reduced and dynamic energy is absorbed via a force compliant member (662) coupled to the test object (666) and the force actuator (669).

10 Claims, 20 Drawing Sheets

U.S. PATENT DOCUMENTS

2007/0051184 A1* 3/2007 Englund et al. .............. 73/805

OTHER PUBLICATIONS

"Components for Drivelines" Machine Design; Jun. 1994, 66, 12; ABI/INFORM Global, p. 130.*

Reinhorn et al. "A Novel Approach to Dynamic Force Control", Proceedings of the Third European Conference on Structural Control, 3ECSC, Jul. 12-15, 2004, Accessed online Sep. 10, 2007. <http://nees.buffalo.edu/Publications/2004-7-12-3ECSC-WienAustria-HybridForce/Paper2Force/Paper/Paper2ForceControl.pdf>.*

Dimig et al. "Effective Force Testing: A Method of Seismic Simulation for Structural Testing". Journal of structural Engineering, Sep. 1999. pp. 1028-1037. Accessed online Sep. 11, 2007. <http://129.89.7.9/People/jzhao/EFT_pages/EFT_1999.pdf>.*

Flint E et al: "Active/passive counter-force vibration control and isolation systems" Aerospace Conference Proceedings, 2000 IEEE Mar. 18-25, 2000, Piscataway, NJ, USA, IEEE, vol. 4, Mar. 18, 2000, pp. 285-298.

Yoonsu Nam et al: "Force control system design for aerodynamic load simulator", American Control Conference, 2000. Proceedings of the 2000 Jun. 28-30, 2000, Piscataway, NJ, USA, IEEE, vol. 5, Jun. 28, 2000, pp. 3043-3047.

* cited by examiner

COMPLIANT COUPLING FORCE CONTROL SYSTEM

RELATED APPLICATION

The present invention is related to U.S. patent application Ser. No. 11/221,006, filed Sep. 7, 2005, entitled "VELOCITY FEEDBACK COMPENSATION FOR FORCE CONTROL SYSTEMS", and issued as U.S. Pat. No. 7,281,431 on Oct. 16, 2007, which is incorporated by reference herein.

TECHNICAL FIELD

The present invention relates generally to force control systems and to vehicle and component testing systems. The present invention is related to the accurate controlling of applied force and the direction of that force on a component or system under test. More particularly, the present invention is related to a technique for providing tensile, compressive, and torsional compliance with minimal degrees of freedom for motion in a force control system.

BACKGROUND OF THE INVENTION

Vehicle systems and components are tested during the development and manufacturing thereof using various techniques. The systems and components undergo static, quasi-static, and dynamic testing to meet and exceed various durability, lifespan, and performance requirements. The testing techniques are used to simulate a working environment and to assure that the systems and/or components under test can survive and perform as desired within that environment.

In performing such tests various actuators are utilized. The actuators apply force on the systems and or components under test. It is desirable that the applied force be accurately controlled. It is also desirable that the actuators when appropriate be capable of following the motion of a device without imposing uncharacteristical forces or in effect restricting the motion of that device. For example, when testing an airfoil or wing of an aircraft tens to hundreds of actuators may be coupled to both sides of that wing. The actuators must work in unison to flex the structure and cause accelerated fatigue. Some tests require high cycle rates, which can be difficult to follow due to changing dynamics experienced by the actuators. As an example, when the wing is being flexed in an upward direction, the actuators coupled to the topside of that wing ought to follow the motion and velocity of that wing without uncharacteristically restricting its movement while the bottom side actuators are applying force in an upward direction. In other words, the non-acting or force-imposing actuators should not impose forces on the wing that would not normally be experienced in a normal operating environment.

Dynamic load control involves the accurate application of compressive and tensile forces to a moving object. When this load is applied using hydraulic actuators and servo valves with classical control methods, the resulting accuracy may be unacceptable at maximum rated pressures and flows. There may be inaccuracy in the applied force relative to the commanded force signals due to motion of the object. This inaccuracy is affected to such a degree that the motion of the object may be drastically reduced to obtain the desired force control accuracy.

Force control systems can also experience lack of symmetry in system polarity. This is especially true when utilizing single ended actuators, in which the amount of lack of symmetry is significant. The lack of symmetry can be due to differences in tubing connections, servo valves, and other components and devices.

Many force control systems, such as lag-lead type, lead-lag type, and pole-zero placement type systems, tend to increase system loop gain in order to reduce steady state error and thus compensate for the motion of the tested object. However, the increased gain may only marginally reduce the error and leads to limit cycling or oscillation and instability in the force control loop. Even with the increased gain, these types of force control systems may not be robust when null shifts occur in the equipment. Null shifts may cause a proportionate amount of force errors to accumulate. Thus, these systems are partially uncontrolled systems and may only be marginally stable and as error increases the systems may become unstable and may be sensitive to null shifts in the hardware.

Another method used to increase system robustness and reduce steady state error is error integration, which is successful in slower systems that do not have backlash and other non-linearities due to mechanical linkages. Backlash can be introduced from, for example, pin-slop. Although useful for static conditions, error integration can cause instability during transitions in force polarity. The integration process increases the settling time required for the actuator to apply an accurate load. This added time constraint reduces the benefit of using integral compensation on durability tests that have fast changing set point commands.

Yet another method used to reduce steady state error is referred to as damping derived from the force signal. This method tends to be slow, which results in larger errors for longer time intervals. The errors are larger due to the increased time for the damping algorithm to correct for the velocity.

Multiple force control systems that incorporate velocity and acceleration compensation are provided in the U.S. patent application Ser. No. 11/221,006, filed Sep. 7, 2005, entitled "VELOCITY FEEDBACK COMPENSATION FOR FORCE CONTROL SYSTEMS" (hereinafter the '006 patent application), which is incorporated by reference herein. These systems overcome steady state errors, increased settling time, and other associated disadvantages commonly associated with force control systems.

However, another common associated disadvantage of force control systems may be an inability to account for force transients. Force transients refer to resultant forces that may be experienced due to object velocity reversals or, in other words, resultant forces due to change in travel direction of an object. Force transients can also occur due to vibrations, shocks, or large abrupt random forces exerted on the system. Although the force control systems of the '006 patent application provide some reduction in force transients, additional reduction is desired.

Several methods have been used to increase stability in force control systems. One method is to reduce the proportional loop gain. This unfortunately may tend to reduce the accuracy, increase errors, and reduce bandwidth or system response. Other methods have included increasing the response of a servo control system, using higher response actuators, using anticipatory logic, lead-lag compensation, lag-lead compensation, notch filtering, pole- zero compensation, and gain scheduling. The stated methods have resulted in marginal stability, reduced stability, stability over limited frequency bandwidth, limits in force output, large, heavy, and expensive actuators, and/or an increase in phase lag at certain frequencies. Increasing the response of a servo control system may be ineffective because the transient disturbance rate is high. Some force control systems as designed are incapable of being easily altered to provide improved stability. In addition, the motion that causes the force transients may be activated by a mechanism that is quicker than the associated force control system, thus preventing the system from being able to account for such transients.

Thus, there exists a need for an improved force control system that accounts for and minimizes the generation of force transients and improves stability of the control system.

SUMMARY OF THE INVENTION

One embodiment of the present invention provides a force compliant mechanism for a force control system that includes a housing. A force compliant volute spring member that has an input end and an output end is disposed within the housing. A force actuator input shaft is coupled to an input end and operates in response to a force induced thereon. An output shaft is coupled to the output end and to a test object. A force transducer is in operative coupling with the force actuator input shaft and generates a force signal in response to the induced force.

Another embodiment of the present invention provides a method of reducing force transients and increasing stability within a force control system. The method includes applying a force on a test object via a force actuator. The force actuator is decoupled from the test object. The overall stiffness of the force control system is reduced and dynamic energy is absorbed via a force compliant member coupled to the test object and the force actuator.

The embodiments of the present invention provide several advantages. One such advantage is the provision of a force compliant coupling mechanism incorporated between force transducer and a specimen under test. The force compliant mechanism decouples the test specimen from a force actuator of a force control system. This reduces and eliminates force transients experienced in the force control system.

Another advantage of the present invention is the provision of a volute spring force compliant member within a force control system. The volute spring member restrains the received output from a force compliant mechanism to a single degree-of-freedom motion.

Yet another advantage of the present invention is the provision of a force control system for actuation and testing of a test object that introduces velocity compensation into the generation of a force that is applied on the test object. The velocity compensation may be introduced in a feedforward or a feedback configuration. The velocity compensation increases and provides accurate control of the test object without the need for integral compensation and provides increased stability in the control system. This compensation also allows for quicker cycling of the test object since the load feedback better follows the force command.

Furthermore, another advantage provided by an embodiment of the present invention is the provision of a force control system that incorporates pressure corrected velocity compensation, which reduces control error. The pressure compensation compensates for the change in available pressure drop across a servo valve.

Still another advantage provided by an embodiment of the present invention is the provision of a force control system with acceleration compensation. This reduces effects of inertia by compensating for the mass of the actuator linkage components.

Moreover, the present invention provides compensation in real time rather than using simply historical information, which is inadequate in a dynamic application. This real time compensation provides mathematically correct compensation magnitudes.

A similar improved quality of force control can be achieved by implementing an algorithm in a force control system that generates both a force command signal and a stroke command signal in a feedforward configuration. This too provides velocity compensation and minimizes control errors and improves performance accuracy.

The present invention itself, together with further objects and attendant advantages, will be best understood by reference to the following detailed description, taken in conjunction with the accompanying drawing.

DETAILED DESCRIPTION

Figure 1:
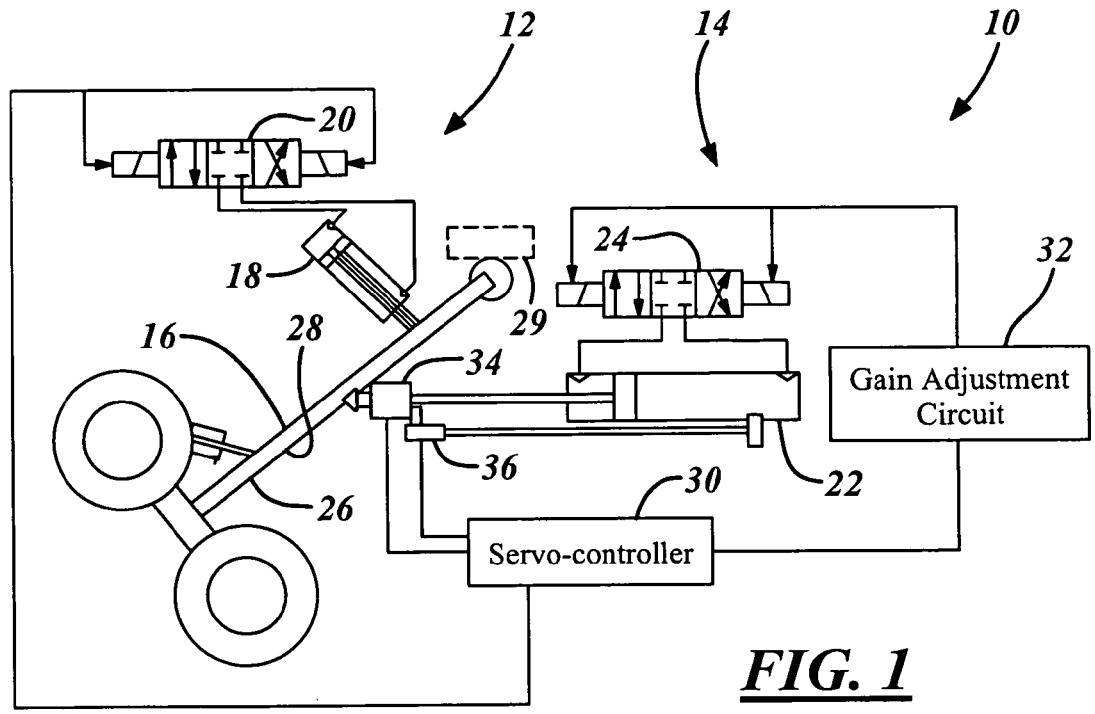
FIG. 1 is a block diagrammatic and schematic view of a portion of a force control system in accordance with an embodiment of the present invention.

One technique of reducing force transients in a hydraulic powered system is to add a passive compliant mechanism between a servovalve and an actuator of a force control system. This technique uses accumulators on force actuator ports of the system. The compliance, however, lowers the phase margin of the hydraulic system. As a result, the instability reached using the stated technique while meeting increased gain requirements, limited the effectiveness.

Another technique used to reduce force transients in a hydraulic powered system is to increase the gain of a force control system. In order to increase the gain, and avoid instability, compensation is added to the control loop using numerous methods. These methods do not provide a substantive reduction in the amplitude of force transient phenomena.

Yet another technique used to reduce force transients in a hydraulic powered system is to add damping to a force control actuator by connecting the ports thereof through a capillary tube or needle valve. This technique allows the gain to be increased thus decreasing the amplitude of the transients. However, this technique is ineffective, since the gain must be increased to compensate for the cross-port flow and thus reduced the efficiency and response of the system.

Still another technique used to reduce force transients in a hydraulic powered system is to add damping to the force control system. When a damper, e.g. shock absorber, is added between a ground reference and a test object, it dampens the velocity transients of the test object, but introduces unnatural constraints on the motion of the test object. The effect of damping is to provide a force that is proportional to velocity. Because of this, a velocity transient of the test object results in increased forces, which are absorbed by the test object motion actuators or transferred to the force control system. This results in increased force transients and thus has an opposite effect as that desired.

In each of the following Figures, the same reference numerals are used to refer to the same components. While the present invention is described with respect to systems and methods of applying a controlled force on a test object and reducing force transients in a force control system, the present invention may be adapted for various applications and systems including: aeronautical systems, land-based vehicle systems, or other applications or systems known in the art that require servicing of a vehicle. The present invention is applicable to force control systems where the object in which a force is applied has motion relative to some inertial reference. This reference may be the same as that of the force control system. The present invention also applied to static and dynamic testing applications.

In the following description, various operating parameters and components are described for one constructed embodiment. These specific parameters and components are included as examples and are not meant to be limiting. Also, various systems and components are described these components may be implemented in hardware and/or software.

Referring now to FIG. 1, a block diagrammatic and schematic view of a portion of a force control system 10 in accordance with an embodiment of the present invention is shown. The force control system 10, for the example embodiment shown, includes a deployment system 12 and an actuation system 14. The deployment system 12 includes a test object 16, a first force and/or position control actuator 18, and a first servo valve or solenoid valve 20. The actuation system 14 includes a second force actuator 22 and a second servo valve 24. The first actuator 18 is coupled to a first side 26 of the test object 16 and the second actuator 22 is coupled to a second side 28 of the test object 16. The force control system 10 may include any number of actuators on various sides of the test object 16. The force actuators may be divided up into sets and positioned on various sides and locations of the test object.

The force actuators are utilized to simulate various operating conditions of the test object 16 and/or to perform various durability, performance, lifespan, and other known testing procedures. The force actuators may sometimes be referred to as rams, cylinders, or pistons. In the example embodiment shown, the first actuator 18 is utilized to simulate the deployment and retraction of aircraft landing gear. The second actuator 22 is utilized to simulate the air drag or pressures experienced on the landing gear during landing of an associated aircraft, which in the test lab is represented by a test stand 29. When the actuation system 22 is not present, the test object 16 moves from fully deployed to fully retracted with only the force of gravity on the test object 16 and the deployment system 12. Note that during a test procedure when the simulated force, such as air pressure, is approximately zero, the second actuator 22 ought to follow the motion of the test object 16 without introducing artificial forces that would not normally be experienced.

The test object 16 may be compliant and have multiple force actuation systems acting thereon. In addition, the test object 16 may be fixed in one or more locations and the compliance may allow motion that is significantly independent of any one of the force actuation systems, i.e. there would be motion even though one of the force control systems was removed.

The first actuator 18 and the second actuator 22 are hydraulic and are driven through the use of the first servo valve 20 and the second servo valve 24, respectively. The servo valves 20 and 24 are controlled via a servo-controller 30 or the like. The hydraulic actuators 18 and 22 and valves 20 and 24 are shown for example purposes, of course, other actuators and control devices may be utilized. A gain adjustment circuit 32 is coupled between the controller 30 and the second valve 22.

A force transducer or load compensation sensor 34 is coupled between the test object 16 and the second actuator 22. A velocity compensation sensor 36 is coupled to the second actuator 22 and the load sensor 34 and detects velocity of the test object 16. The controller 30 adjusts the speed and position of the actuators 18 and 22 in response to signals received from the load sensor 34 and the velocity sensor 36. The components and devices of the force control system 10 are described in further detail below with respect to the embodiments of FIGS. 2-13. The force control system 10 is applicable to both linear and rotary force applied force systems.

Figure 2:
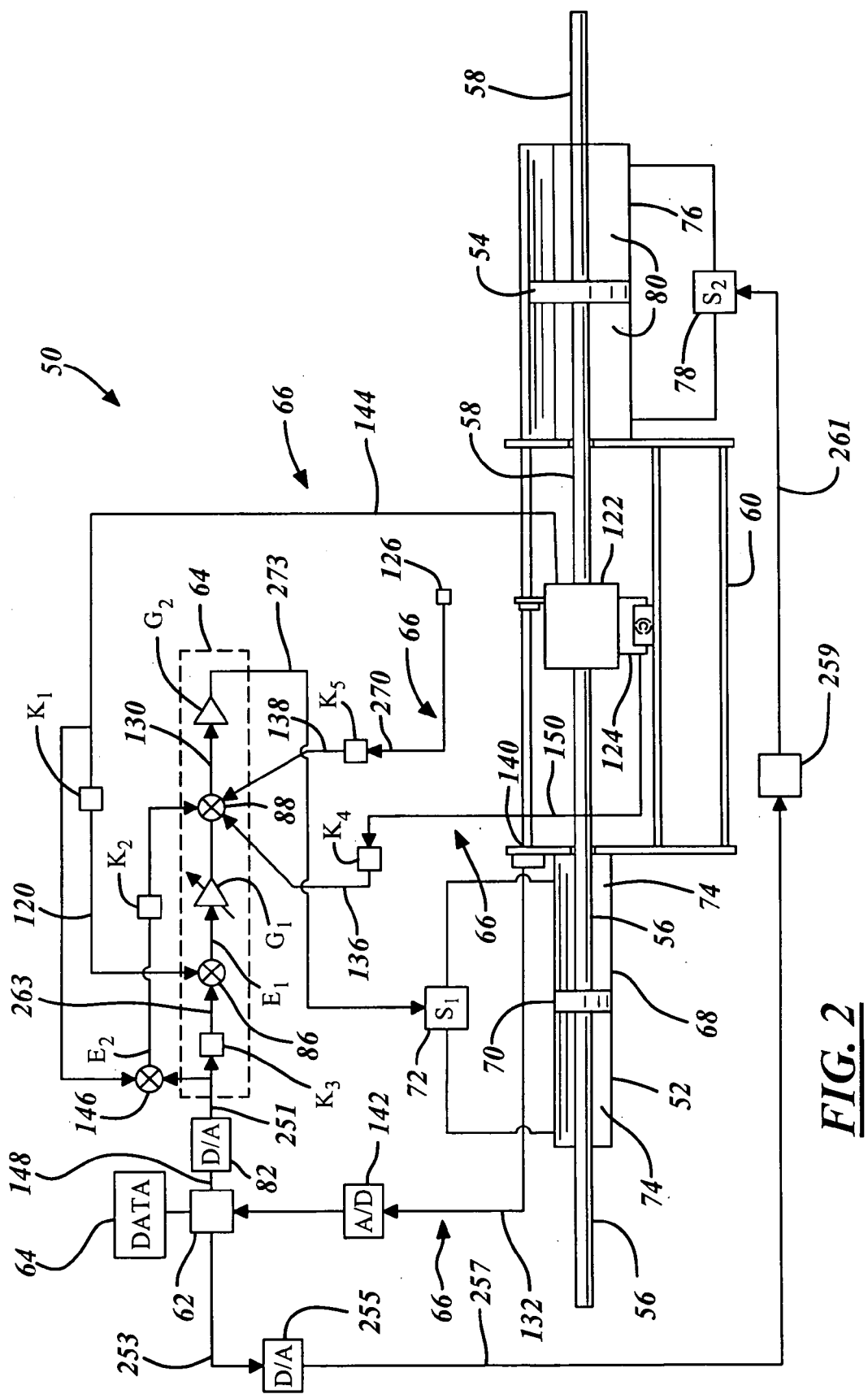
FIG. 2 is a block diagrammatic and schematic view of the force control system in accordance with an embodiment of the present invention.

Referring now to FIG. 2, a block diagrammatic and schematic view of the force control system 50 in accordance with an embodiment of the present invention is shown. The force control system 50 includes one or more force actuators and one or more test objects. In the example setup shown, a single force actuator 52 and a single test object 54 are shown. The force actuator 52 and the test object 54 are coupled to each other via an actuator shaft 56 and a test object shaft 58. The force actuator 52 and the test object 54 are held on a test stand 60. A controller 62 is coupled to the force actuator 52 and the test object 54 and controls the static and dynamic force applied on and the position of the test object 54. The control system 10 also includes one or more gain adjustment circuits 64 (only one is shown) and multiple feedback sensor configurations 66.

The force actuator 52 may be of various types and styles. A sample hydraulic force actuator is shown. The hydraulic actuator 52 includes an actuator housing 68 and an actuator piston 70 disposed therein. The position and the rate of change in position of the actuator piston 70 is adjusted by the controller 62 via a first servo valve 72. Operation of the valve 72 controls the flow of hydraulic fluid to and from for and aft sides 74 of the actuator piston 70 within the actuator housing 68.

The test object 54 may be of various types and styles. A test object 54 may, for example, be an airfoil, a door, a body panel, or other test object known in the art. A sample test object is shown. The test object shown is in the form of a hydraulic piston, hereinafter referred to as an "object piston", that is located within an object housing 76. The force applied on the object piston 54 is based on a force applied from the actuator 52. The position and rate of change in position of the object piston 54 is adjusted by the controller 62 via the second servo valve 78. Operation of the second valve 78 controls the flow of hydraulic fluid to and from for and aft sides 80 of the object piston 54 within the object housing 76.

The controller 62 may be microprocessor based such as a computer having a central processing unit, memory (RAM and/or ROM), and associated input and output buses. The controller 62 may be an application-specific integrated circuit or may be formed of other logic devices known in the art. The controller 62 may be a portion of a central control unit, an interactive vehicle dynamics module, or be combined into a single integrated controller, or may be a stand-alone controller as shown.

The controller 62 may include or be coupled to a memory 64, as shown. The memory 64 may have stored testing data and related information for performing a predetermine test. The controller 62 may have tables, parameter relationships, and other tools needed to accurately control and perform a given test.

The gain adjustment circuit 64 is coupled to the controller 62 via a digital to analog (D/A) converter 82. The gain adjustment circuit 64 includes an integration circuit $K_3$, a first summing junction 86, a first gain block $G_1$, a second summing junction 88, and a second gain block or actuator servo driver $G_2$, which are coupled in series as stated.

Figure 3:
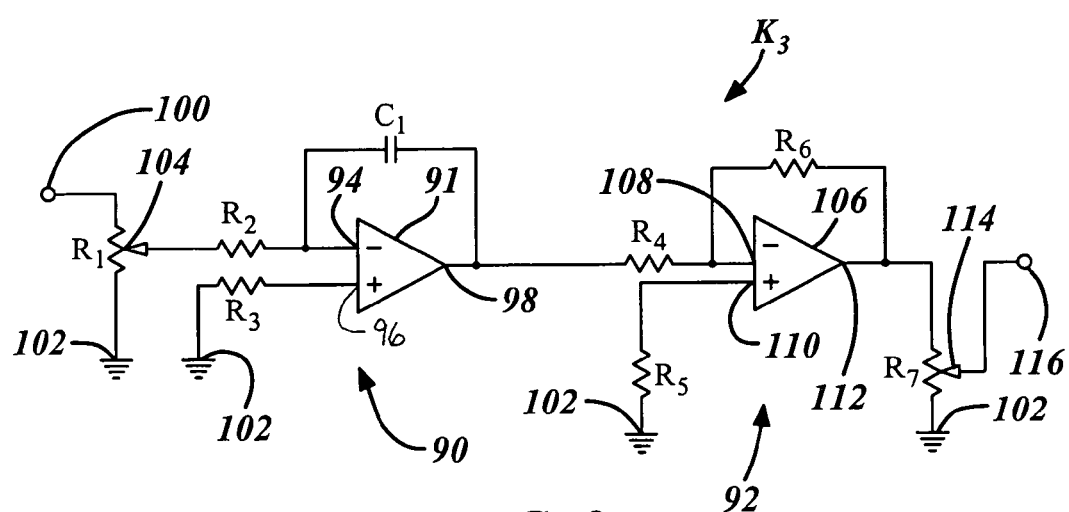
FIG. 3 is a schematic diagram of an integration circuit in accordance with an embodiment of the present invention.

Referring now also to FIG. 3, a schematic diagram of the integration circuit $K_3$ in accordance with an embodiment of the present invention is shown. The integration circuit $K_3$ includes an integration stage 90 and an amplification stage 92. The integration stage 90 includes a fist operational amplifier 91 having an inverting input 94, a non-inverting input 96, and an output 98. The input 100 of the integration circuit $K_3$ and of the integration stage 90 is coupled to a first resistor $R_1$, which is in turn coupled to a ground 102. The first resistor $R_1$ may be a variable resistor as shown. The wiper terminal 104 of the variable resistor $R_1$ is coupled to the inverting input 94 via a second resistor $R_2$. A third resistor $R_3$ is coupled between the non-inverting input 96 and ground 102. A first capacitor $C_1$ is coupled across the first amplifier 91 between the inverting input 94 and the first amplifier output 98.

The amplification stage 92 includes a second operational amplifier 106 that has an inverting input 108, a non-inverting input 110, and an output 112. A fourth resistor $R_4$ is coupled to the output 112 of the integration stage 92 and to the inverting input 108. A fifth resistor $R_5$ is coupled between the non-inverting input 110 and ground 102. A sixth resistor $R_6$ is coupled across the second amplifier 106 between the inverting input 108 and the second amplifier output 112. A seventh resistor $R_7$, which is shown as a variable resistor, is coupled between the second amplifier output 112 and ground 102. The wiper terminal 114 of the seventh resistor $R_7$, in the example embodiment shown, is also the output 116 of the amplification stage 92 and the integration circuit $K_3$.

The first summing junction 86 sums a feedback signal 120 received from a load sensor 122 with the output 116 to generate a first error signal $E_1$. The gain block $G_1$ adjusts amplification of the first error signal $E_1$. The second summing junction 88 sums feedback signals from a velocity sensor 124 and an acceleration sensor 126 and a second error signal $E_2$ to generate a desired applied force signal 130. The velocity sensor 124 may be considered a velocity signal generator. The actuator servo driver $G_2$ adjusts the gain of the desired applied force signal 130.

The feedback sensor configurations 66 generate a position compensation signal 132, the load compensation signal 120, a velocity compensation signal 136, and an acceleration compensation signal 138. The position feedback 132 includes a test object position sensor 140 that is coupled to the test object, which in continuing from the above example is the object piston 54. The position signal 132 is feedback to the controller 62 through an analog-to-digital (A/D) converter 142.

The load sensor 122 is coupled between the force actuator 52 and the object piston 54. The load signal 144 generated from the load sensor 122 is feedback to the gain adjustment circuit 64. The load signal 144 is feedback to an amplification block $K_1$, and subsequently to the first summing junction 86. The amplification block $K_1$ includes amplification and balancing adjustment circuitry. The load signal 144 is also feedback to a third summing junction 146 where it is summed with a load or force command signal 148 to form the true error signal $E_2$. The true error signal E2 passes through a second amplification block $K_2$ prior to being received by the second summing block 88.

Figure 4:
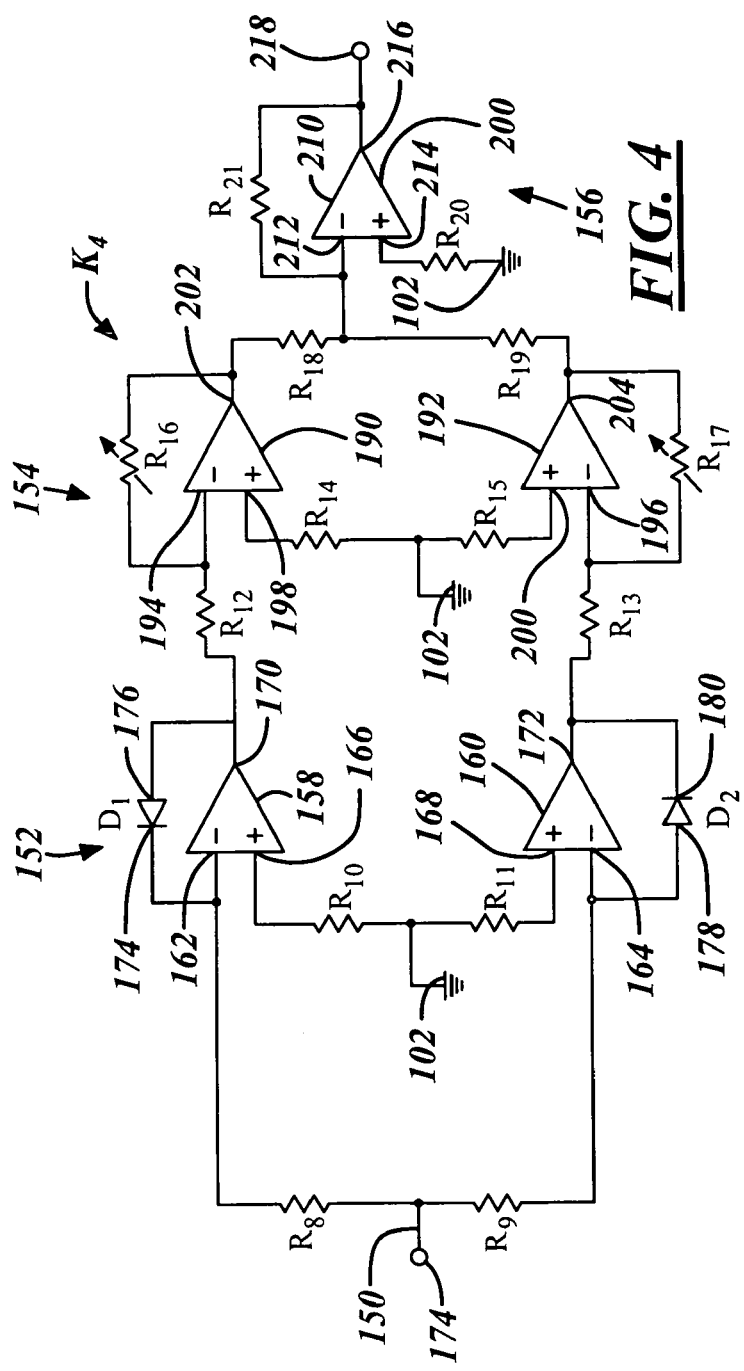
FIG. 4 is a schematic diagram of a velocity gain adjustment circuit in accordance with an embodiment of the present invention.

Referring now also to FIG. 4, a schematic diagram of the velocity gain adjustment circuit $K_4$ in accordance with an embodiment of the present invention is shown. The velocity signal 150 generated by the velocity sensor 124 is feedback to the second summing block 88 through a velocity-conditioning block $K_4$. The velocity-conditioning block $K_4$ includes a rectification stage 152, an inversion stage 154, and a combining stage 156. The rectification stage 152 includes a third operational amplifier 158 and a fourth operational amplifier 160, which have inverting inputs 162, 164, non-inverting inputs 166, 168, and outputs 170, 172, respectively. The velocity signal 150 enters the conditioning block input 174 and is separated into positive and negative components, which are rectified. The input 174 is coupled to the resistors $R_8$ and $R_9$. The resistor $R_8$ is coupled to the inverting input 162. The resistor $R_9$ is coupled to the inverting input 164. The non-inverting inputs 166, 168 are coupled to resistors $R_{10}$ and $R_{11}$, respectively, which in turn are coupled to ground 102. A first diode $D_1$ having a cathode terminal 174 and an anode terminal 176 is coupled across the third amplifier 158. The cathode terminal 174 is coupled to the inverting terminal 162. The anode terminal 176 is coupled to the third output 170. A second diode $D_2$ that has a second anode terminal 178 and a second cathode terminal 180 is coupled across the fourth amplifier 160. The second anode terminal 178 is coupled to the inverting input 164 and the second cathode terminal 180 is coupled to the fourth output 172.

The inversion stage 154 includes a fifth operational amplifier 190 and a sixth operational amplifier 192, which have inverting inputs 194, 196, non-inverting inputs 198, 200 and outputs 202, 204, respectively. Resistor $R_{12}$ is coupled between the third output 170 and the inverting input 194. Resistor $R_{13}$ is coupled between the fourth output 172 and the inverting input 196. Resistors $R_{14}$ and $R_{15}$ are coupled between the non-inverting inputs 194, 196, respectively, and ground 102. The variable resistor $R_{16}$ is coupled across the fifth amplifier 190 between the inverting input 194 and the fifth output 202. The variable resistor $R_{17}$ is coupled across the sixth amplifier 192 between the inverting input 196 and the sixth output 204.

The combining stage 156 includes a seventh operational amplifier 210 having an inverting input 212, a non-inverting input 214, and an output 216. Resistor $R_{18}$ is coupled between the fifth output 202 and the inverting input 212. Resistor $R_{19}$ is coupled between the sixth output 204 and the inverting input 212. Resistor $R_{20}$ is coupled between the non-inverting input 214 and ground 102. Resistor $R_{21}$ is coupled across the seventh amplifier 200 between the inverting input 212 and the seventh output or the output 218 of the velocity-conditioning block $K_4$, which may be referred to as a polarity compensator.

The acceleration signal 220 generated by the acceleration sensor 126 is feedback to the second summing junction 88 through an acceleration-conditioning block $K_5$. The acceleration-conditioning block K 5 includes excitation, amplification, and balance adjustment circuitry known in the art that is commonly utilized with respect to acceleration sensors.

The load sensor 122, the velocity sensor 124, the acceleration sensor 126, and the position sensor 140 may be of various types and styles known in the art. Some examples of load sensors are, load cells, strain gages, piezoresistive sensors, and other known force sensors. Some examples of velocity sensors are Hall effect sensors, pitot tube arrays, position sensors that provide actual velocity information, and pressure sensors. Some example acceleration sensors are accelerometers, infrared sensors, laser sensors, and ultrasonic sensors. Some examples of position sensors are infrared sensors, linear and rotary potentiometers, ultrasonic sensors, and magnetic sensors.

Figure 5A:
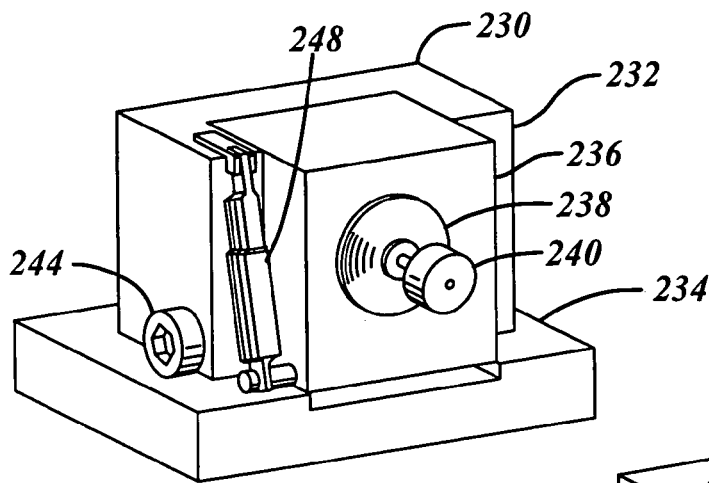
FIG. 5A is a front perspective view of a sample velocity transducer assembly in accordance with an embodiment of the present invention.
Figure 5B:
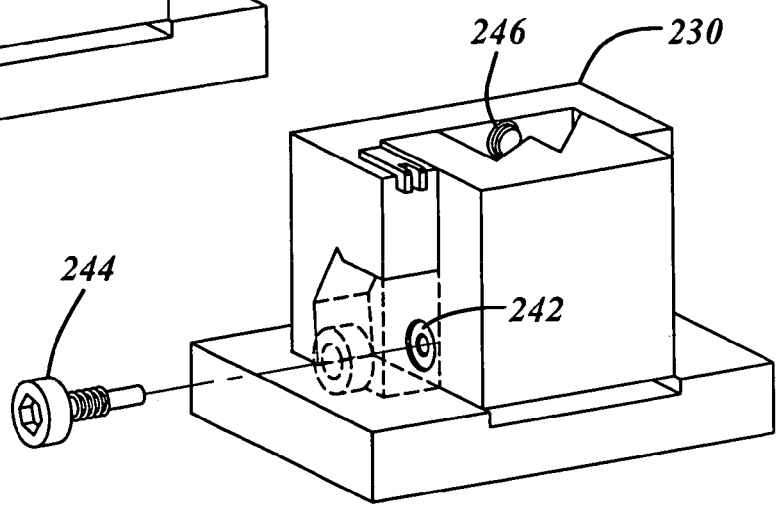
FIG. 5B is a back perspective view of the velocity transducer assembly of FIG. 5A.

Referring now also to FIGS. 5A and 5B, front and back perspective views of a sample velocity transducer assembly 230 in accordance with an embodiment of the present invention is shown. The velocity transducer assembly 230 may be used in replace of the velocity sensor 124. The velocity transducer assembly 230 includes fixed backing member 232 that is mounted on a base 234. A transducer housing 236 is coupled to the backing member 232 and to the base 234. A transducer 238 is disposed within the housing 236 and may be coupled to the test object shaft 58 via a rotatable wheel 240. The transducer 238 has an output that is proportional to velocity and is rated in volts per revolutions per minute (RPM). The wheel 240 is utilized to convert linear motion into rotational motion. Of course, other coupling methods between the transducer 238 and the object piston 54 may be utilized.

The housing 236 is coupled on each side thereof to a bearing 242, which is secured by a threaded step shaft 244. The bearing 242 allows the wheel 240 to pivot up and down accommodating irregularities in the surface on which it rolls. A spring 246 is incorporated between the backing member 232 and the housing 236 to maintain contact between the wheel 240 and the object piston 54. The spring 246 provides the proper amount of contact force. A damper 248, which may be fluidic, is coupled between the backing member 232 and the housing 236 and prevents the velocity transducer 238 from oscillating.

Figure 6:
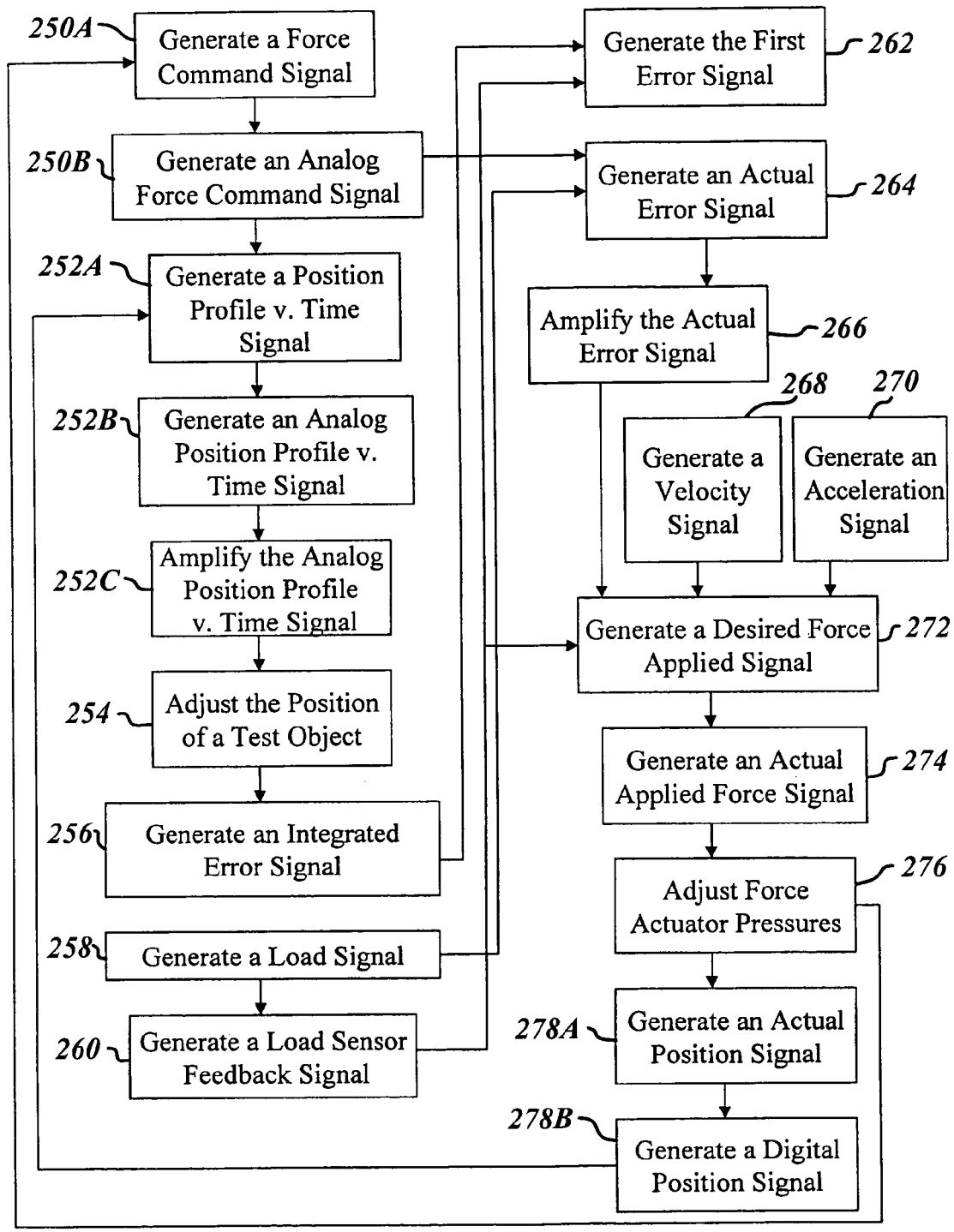
FIG. 6 is a logic control diagram illustrating a method of operating a force control system in accordance with an embodiment of the present invention.

Referring now to FIG. 6, a logic control diagram illustrating a method of operating a force control system and/or of applying a force on a test object in accordance with an embodiment of the present invention is shown. Although the following steps 250-278 are described primarily with respect to the embodiment of FIG. 2, the steps and associated method may be applied to other embodiments of the present invention.

In step 250A, the controller 62 generates a force command signal 148 in response to the actual position signal 132, generated in step 278 below. In step 250B, the first D/A converter 82 coverts the force command signal 148 into an analog force command signal 251.

In step 252A, the controller 62 generates a position profile versus time signal 253. The position profile signal 253 may be in the form of a velocity signal. In step 252B, the second D/A converter 255 converts the position profile signal 253 into an analog position profile signal 257. In step 252C, the analog position profile signal 257 is amplified via the valve amplifier 259 to form an amplified position profile signal 261. In step 254, the position of the test object is adjusted in response to the amplified position profile signal 261.

In step 256, the analog command signal 251 is received by a gain adjustment circuit and is passed to the integration circuit $K_3$. The integration circuit $K_3$ adjusts the gain of the analog command signal 251 and generates an integrated error signal 263.

In step 258, the load sensor 122 generates the load signal 144. In step 260, the load signal 144 is amplified by the amplification block $K_1$ to form the load sensor feedback signal 120. In step 262, the integrated error signal 263 is summed with the load sensor feedback signal 120 to generate the first error signal $E_1$. In step 264, the load signal 144 is summed with the analog command signal 251 to form the true or actual error signal $E_2$. In step 266, the actual error signal $E_2$ is amplified by the amplification block $K_2$.

In step 268, the velocity sensor 124 generates the velocity signal. In step 270, the acceleration sensor 126 generates the acceleration signal.

In step 272, the first error signal $E_1$ is amplified by the gain block $G_1$ and is summed with the velocity compensation signal 136, the acceleration compensation signal 138, and the actual error signal $E_2$ to form the desired applied force signal 130. In step 274, the gain of the desired applied force signal 130 is adjusted by the second gain block $G_2$ to form the actual applied force signal 273. In step 276, the actuator valve 72 receives the actual applied force signal 273 and adjusts pressures within the force actuator 52 in response thereto.

In step 278A, the position sensor 140 generates the actual position signal 132 indicative of the position of the object piston 54. In step 278B, the position signal 132 is converted to a digital signal.

Steps 250-278 are continuously repeated until the end of a test procedure. The above-described steps are meant to be illustrative examples; the steps may be performed sequentially, synchronously, simultaneously, or in a different order depending upon the application.

Figure 7:
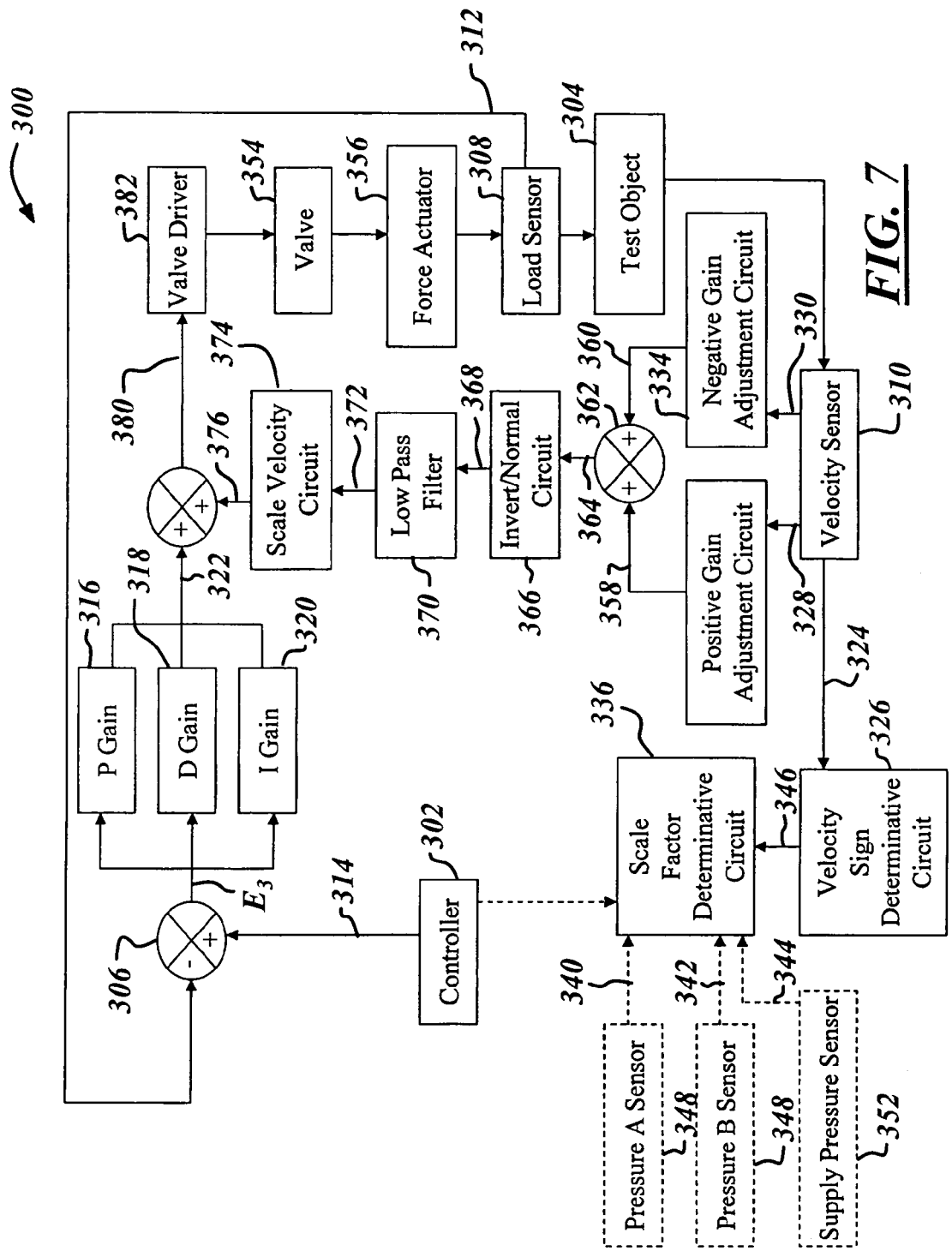
FIG. 7 is a block diagrammatic and schematic view of a force control system in accordance with another embodiment of the present invention.

Referring now to FIG. 7, a block diagrammatic and schematic view of a force control system 300 in accordance with another embodiment of the present invention is shown. The force control system 300 includes a controller 302 and a test object 304. The controller 302 is similar to the controller 62 and is coupled to a forth summing junction 306. The test object 304 is coupled to a load sensor 308 and a velocity sensor 310. The load sensor 308 is also coupled to the forth junction 306. A load signal 312 from the load sensor 308 is subtracted from a force command signal 314 from the controller 302 via the forth junction 306 to form an error signal $E_3$. The error signal $E_3$ is gain adjusted via a proportional gain adjustment circuit 316, a derivative gain adjustment circuit 318, and an integral gain adjustment circuit 320 to form a modified command signal 322.

The velocity sensor 310 generates a velocity signal 324 that is sent to a velocity sign determinative circuit 326 and is separated into a positive portion 328 and a negative portion 330. The portions 328 and 330 are adjusted via a positive gain adjustment circuit 332 and a negative gain adjustment circuit 334, respectively. The velocity sensor 310 may have a velocity signal offset adjustment (not shown). The velocity compensation is applied to compensate for the polarity, amplitude, and offset of the velocity signal.

When a force actuator of a force control system is driven using hydraulic fluid power and is controlled via a servo valve, as described herein, there may be a loss of force command accuracy. The loss is associated with fluctuations in the available supply pressure, or supply pressure drops, for the velocity compensation in the servo valve. Pressure inaccuracies may also result from the use of large amounts of available pressure to produce the forces that are commanded. Thus, there may be a need to correct for the change in the pressure available for velocity compensation in the servo valve.

Output from the sign determinative circuit 326 is passed to a scale factor determinative circuit 336. The scale factor determinative circuit 336 generates a pressure scale factor 338 in response to force actuator pressures 340 and 342, supply pressure 344, and sign of the velocity signal 346. The pressure scale factor 338 is described in further detail below with respect to expression 5.

The force actuator pressures 340 and 342 and the supply pressure 344 may be generated via a port A pressure sensor 348, a port B pressure sensor 350, and an input pressure sensor 352, or may be calculated by the controller 302. The controller 302 may have stored data relating commanded forces for a given application, fuel control system specifications, fluid circuit specifications, valve specifications, force actuator specifications, as well as other specifications to pressures within and supplied to the valve 354 and force actuator 356.

The gain adjusted positive and negative portions 358 and 360 of the velocity signal are summed via a fifth summing junction 362 to form a combined signal 364. The gain adjustment of the positive and negative portions 358 and 360 provides the proper velocity compensation value and enables the velocity compensation for the inherent lack of symmetry from single ended actuators and other sources.

The combined signal 364 is inverted by an invert/normal, circuit 366, since there is no standard predefined polarity for the velocity. The inverted signal 368 is then filtered through a low pass filter 370. The low pass filter 370 may be set just below the natural frequency of the force control system 300 to reduce the tendency for oscillation due to the velocity input. The filtered signal 372 is scaled using a scale velocity circuit 374. The scaling circuit 374 scales the filtered signal 372 by the pressure scale factor 338 determined above. The force control system 300 may also have the ability to enable and disable the velocity compensation and/or the pressure compensation.

Note that the scaled filtered signal 376 is feedback into the control loop following the proportional, integral, and derivative gain adjustments. This prevents the affect of the gain adjustments on the velocity compensation.

With simple or traditional closed loop control when the error is zero, the output of the controller is zero. Since a typical servo valve is closed at zero input there has to be error for the valve to be open. The larger the velocity, the more error is developed to open the valve. The present invention overcomes this by biasing the servo valve open, in an amount that is proportional to the velocity. Thus, the valve can be open without introducing error into the force control loop, to allow for the movement of the test object.

The use of the filter limits instability due to the addition of the velocity compensation. The filter is adjustable and is specific to the velocity compensation.

The scaled filtered signal 376 is summed with the modified command signal 322 via a sixth summing junction 378 to form a desired applied force signal 380. The desired applied force signal is conditioned for valve control via a valve driver 382.

The following FIGS. 8-13 provide a further detailed explanation for the reasoning for velocity and pressure compensation.

Figure 8:
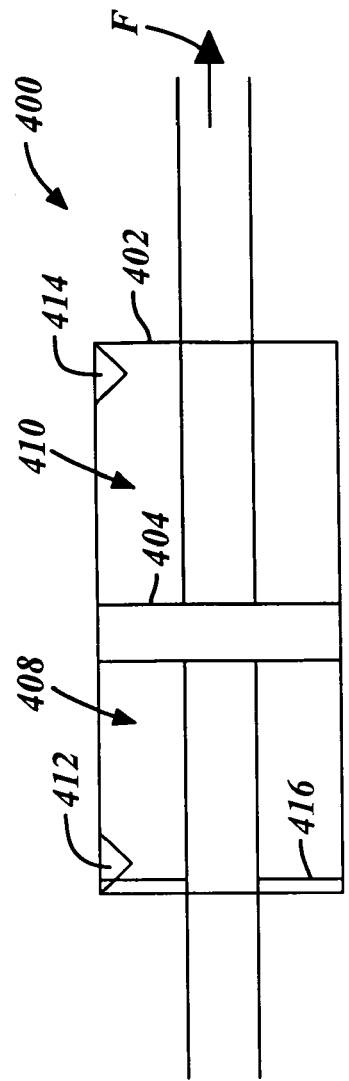
FIG. 8 is a side cross-sectional view of a force actuator in accordance with an embodiment of the present invention.

Referring now to FIG. 8, a side cross-sectional view of a force actuator 400 in accordance with an embodiment of the present invention is shown. The force actuator 400 includes a housing 402 with a piston 404 disposed and translational therein on a shaft 406. The housing 402 is divided internally by the piston 404 to form a first side 408 and a second side 410. The first side 408 and the second side 410 have a first port 412 and a second port 414, respectively, having pressures $P_A$ and $P_B$. A predetermined or incremental amount of fluid 416 is added into the force actuator 400 on the first side 408. Force F generated by the addition of the fluid 416 is equal to the pressure P in the first side 408 multiplied by the cross-sectional area A of the piston 404. Expression 1 provides the pressure P, where $\beta_\epsilon$ is the effective bulk modulus, V is the volume on the first side 408, and Q is the fluid flow rate.

$$P = \frac{\beta_\epsilon}{V} \int Q dt \quad [1]$$

When the associated test object has compliance and moves, the incremental quantity of fluid injected into the actuator 400 may be increased until the stiffness of the test object balances the desired force output by the actuator 400.

Figure 9:
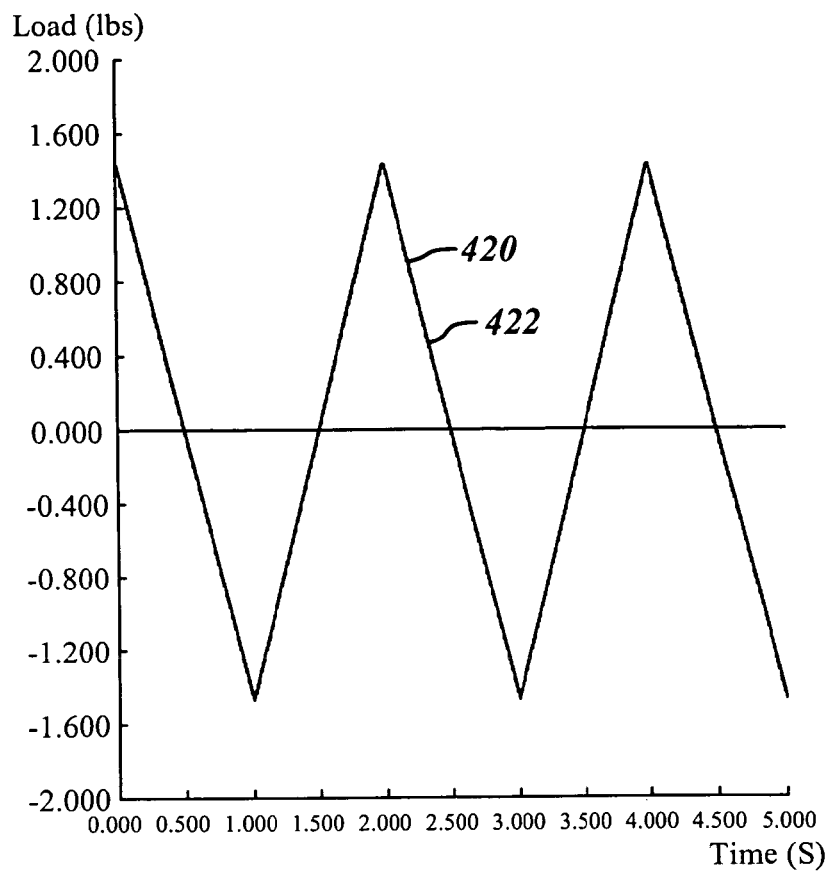
FIG. 9 is a sample plot of a force on a stationary object.

Referring now to FIG. 9, a sample plot of a force on a stationary object is shown. A triangular force profile is shown for a test object having a small amount of compliance. Although in FIG. 9 it appears that a single curve is shown, in actuality two curves are present a force command curve 420 and an actual force curve 422. The error between the force command curve 420 and the actual force curve 422 is so small that it appears as though a single curve is shown.

Figure 10:
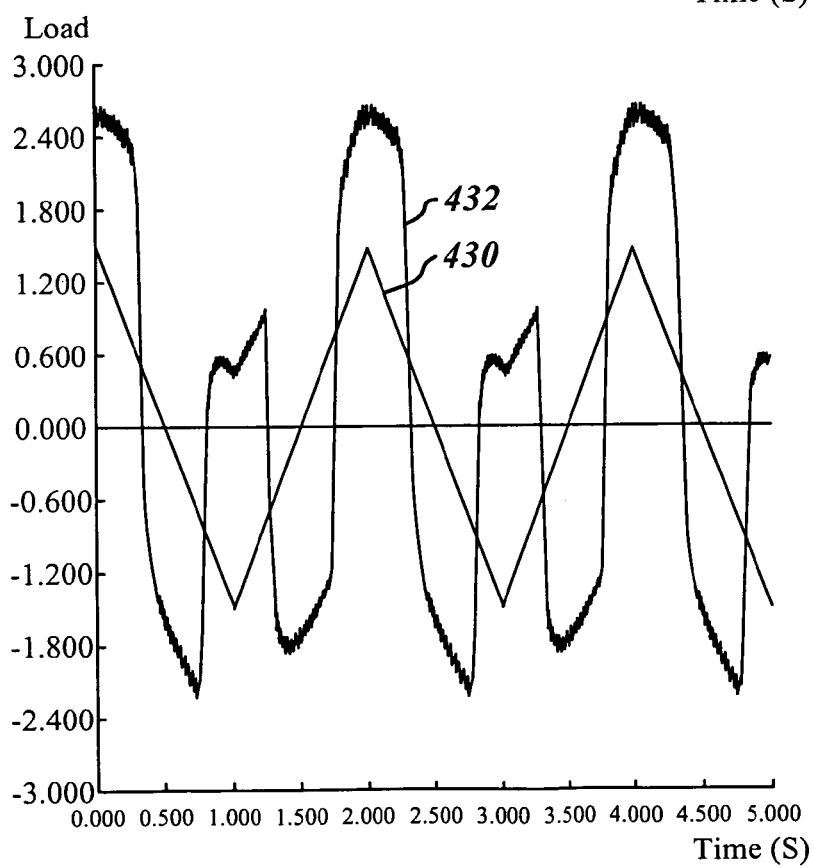
FIG. 10 is a sample plot comparing a force command signal with an actual force on an object in motion.

Referring now to FIG. 10, a sample plot comparing a force command signal 430 with an actual force signal 432 on an object in motion is shown. When the object that the force is applied on is moving, expression 1 is no longer adequate. The object is set in an oscillatory motion. Notice that the actual force signal 432 does not follow the force command signal 430. Expressions 2 and 3 also need to be satisfied in order for the control system to follow the velocity of the object.

$$Q = A * \text{Vel} \quad [2]$$

$$Q = K_V i \quad [3]$$

Vel is the velocity of the object, which is proportional to the valve electrical current if the desired force remains constant. The velocity is proportional or directly related to the valve current. This proportionality is linear when the programmed force is constant. $K_V$ is the valve constant and i is the valve current. Expressions 2 and 3 satisfy the flow rate required for the actuator to match the velocity of the object with no net force. When expressions 2 and 3 are both satisfied, the actuator is following the motion of the object without applying force on the object.

Figure 11:
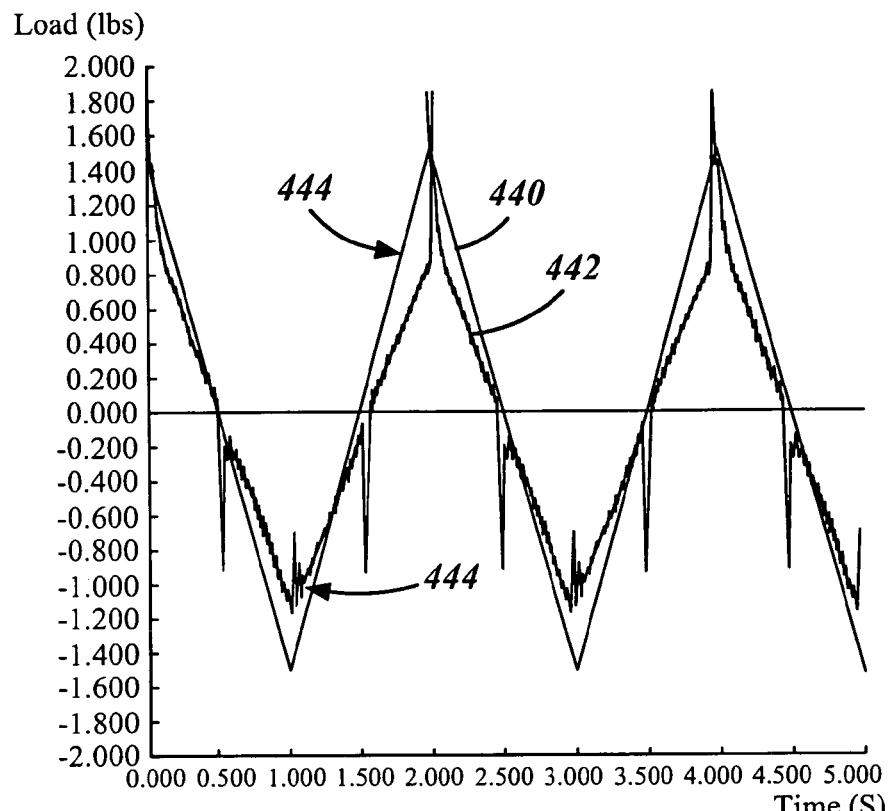
FIG. 11 is a sample plot comparing a force command signal with an actual force on a test object in motion using velocity compensation in accordance with an embodiment of the present invention.

Referring now to FIG. 11, a plot comparing a force command signal 440 with an actual force signal 442 on a test object in motion using velocity compensation in accordance with an embodiment of the present invention is shown. The actual force signal 442 follows the force command signal 440 much closer than that of FIG. 10 when velocity compensation is not used. Notice that the actual force has "drooping" areas 444 in comparison to the force command signal 440. The drooping areas are due to the force that is being created. The pressure available to provide the velocity compensation is decreased. Thus, pressure compensation or force correction is used to overcome this drooping effect.

Expression 2 and 3 provide the velocity compensation that is used when there is a constant specified pressure drop across the actuator valve. When this pressure drop varies, the current to produce the flow rate varies with the square root of the pressure drop. This is derived from the orifice expression 4, which is a non-linear function of the pressure drop across the orifice of the actuator valve.

$$Q = C_d A_d \sqrt{\frac{2}{\rho}(P_S - P_R)} \quad [4]$$

$C_d$ is the discharge coefficient, $A_d$ is the area of the orifice, $P_S$ is the supply pressure, and $P_R$ is the return pressure. $P_R$ is equal to the absolute value of the first port pressure $P_A$ minus the second port pressure $P_B$. $\rho$ is the density of the fluid 416.

For simplicity return pressure $P_R$ may be assumed to be zero. The pressure scale factor is introduced for the amount the velocity compensation current $i_1$, which is set with zero force from the actuator, i.e. the first port pressure $P_A$ is equal to the second port pressure $P_B$, is to be scaled to compensate for the force and the available pressure. The resultant current is referred to as current $i_2$, as shown in expression 5, where $$\frac{\sqrt{P_1}}{\sqrt{P_2}}$$

is the pressure scale factor, $P_1$ is equal to the supply pressure available at zero load when the velocity compensation is adjusted, and $P_2$ is shown by expression 6.

$$i_1 = i_1 * \frac{\sqrt{P_1}}{\sqrt{P_2}} \quad [5]$$

$$P_2 = P_S - |P_A - P_B| * (\text{sign of the velocity}) \quad [6]$$

There are four states in dynamic load control of an object with independent motion. State 1 and state 2 refer to when the force applied is aiding the velocity compensation. In state 1 and state 2 the velocity compensation is directed in the opposite direction as the force or $P_2 = P_S + |P_A - P_B|$. State 1 refers to when the velocity compensation is positive and the force is negative, in other words, $P_A < P_B$ and $P_{Avail} = P_A - P_B$, which is negative. State 2 refers to when the velocity compensation is negative and the force is positive, in other words, $P_A > P_B$ and $P_{Avail}$ which is positive.

State 3 and state 4 refer to when the force applied subtracts from the velocity compensation. In state 3 and state 4 the velocity compensation is directed in the same direction as the force or $P_2 = P_S - |P_A - P_B|$. State 3 refers to when the force applied and the velocity compensation is positive, in other words, $P_A > P_B$ and $P_{Avail}$ is positive. State 4 refers to when the force applied and the velocity compensation are negative, in other words, $P_A < P_B$ and $P_{Avail}$ is negative.

Figure 12:
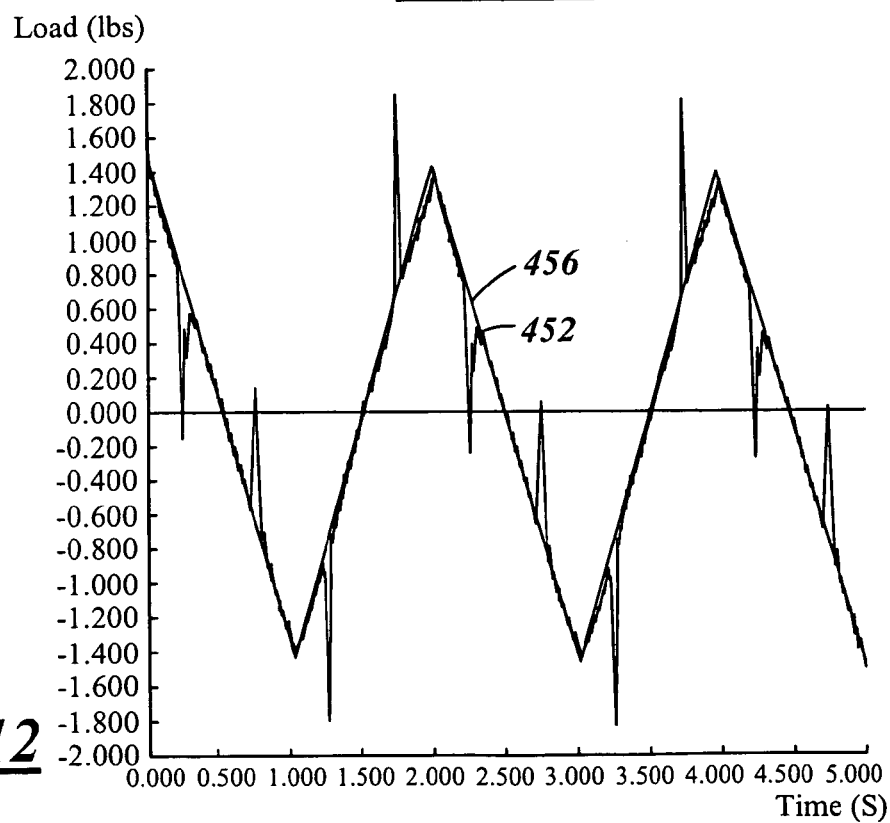
FIG. 12 is a sample plot comparing a force command with an actual force on a test object using velocity and pressure compensation in accordance with an embodiment of the present invention.

The introduction of the pressure scale factor into the control loop reduces error or eliminates the drooping effect shown in FIG. 11. This is shown in FIG. 12. In FIG. 12, a plot comparing a force command signal 450 with an actual force signal 452 on a test object using velocity and pressure compensation in accordance with an embodiment of the present invention is shown. Note also that force transients are shown in FIGS. 11 and 12. The force transients are minimized and/or eliminated using the force compliant coupling mechanisms described below with respect to FIGS. 17-19 and FIGS. 22-35.

Figure 13:
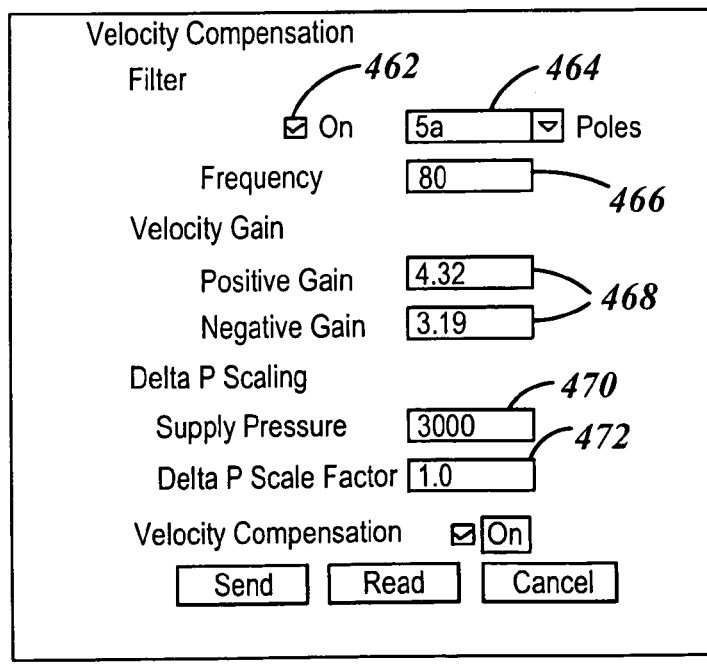
FIG. 13 is a front view of a velocity compensation interface in accordance with an embodiment of the present invention.

Referring now to FIG. 7 and to FIG. 13, in which a front view of a velocity compensation interface 460 in accordance with an embodiment of the present invention is shown. A majority of the devices of the force control system 300, shown in FIG. 7, may be implemented in both software and hardware. The software may contain various algorithms for performing the stated and associated tasks. The software may be operated via a controller and have software based inputs with a user interface. The interface 460 shown is an example of a software implementation. The interface 460 includes a filter enablement box 462, a number of poles input 464 for the filter, and a cutoff frequency input 466 for the filter. Positive and negative gain adjustment inputs 468 are also provided. The associated software may determine the sign of the velocity signal and scale the positive and negative portions thereof by the positive and negative gain input values. This software code may take the place of or be used instead of the polarity compensator $K_4$ above.

The interface 460 also includes a delta P scaling section, which has a supply pressure input 470 and a delta P scale factor input 472. The supply pressure input 470 is a constant value. The actual real time supply pressure value may be read by the algorithm, instead of using the constant value 470, and thereby compensate for droop and irregularities in the supply pressure to the load control servovalve. The delta P scale factor 472 is used to adjust the effectiveness of the pressure compensation. The delta P scale factor 472 may be multiplied by the pressure scale factor 338 to increase or reduce the amount of pressure compensation.

The forces applied in moving test objects are often non-linear functions of another variable, such as landing gear angle. The present invention in compensating for the velocity and the acceleration of the test object and the pressures associated with the force actuator valve applies an accurate force profile to the test object. The velocity compensation results in a more stable system, and this is especially realized when multiple force systems are installed on a single test object. This is because of the loop gain of the force control system, which may be reduced as much as 90%, since it does not have to compensate for the motion of the object and only has to provide closed loop control of the force.

The present invention also provides a means to apply a force to a moving object when the motion is not a dependent function of the applied force. The present invention provides an accurate force even when there are fluctuations in supply pressure or lack of available pressure across a servo valve delivering hydraulic power to the force producing device.

Figure 14:
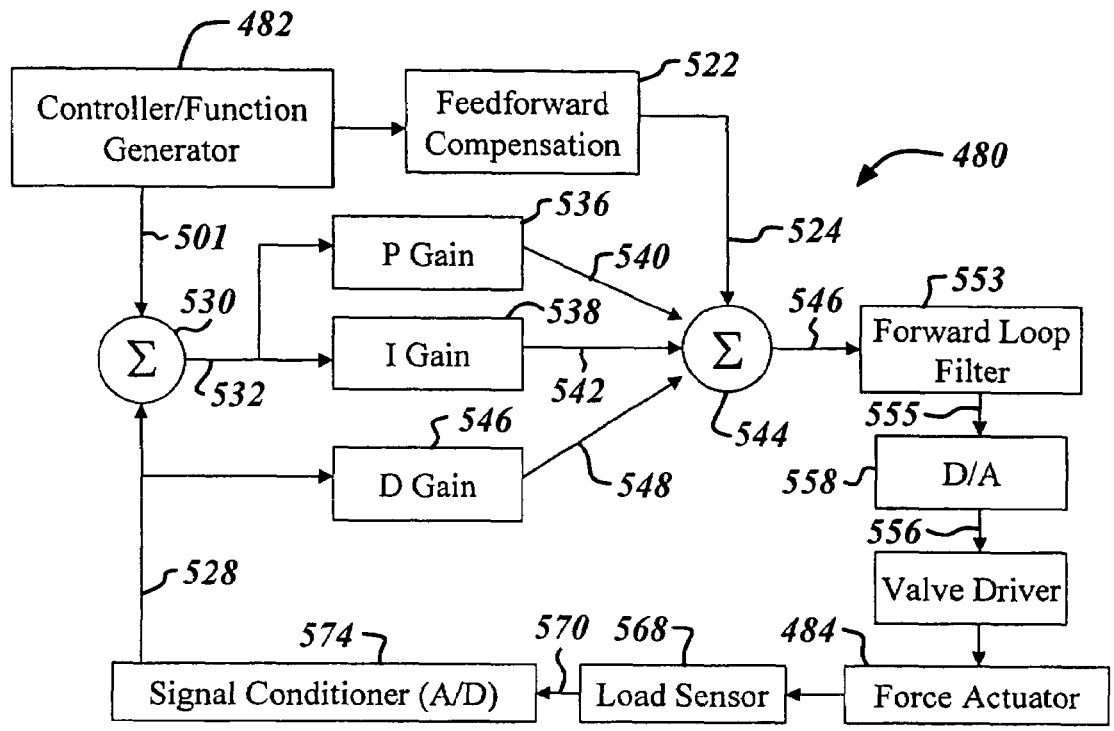
FIG. 14 is a block diagrammatic view of force control system in accordance with yet another embodiment of the present invention.
Figure 15:
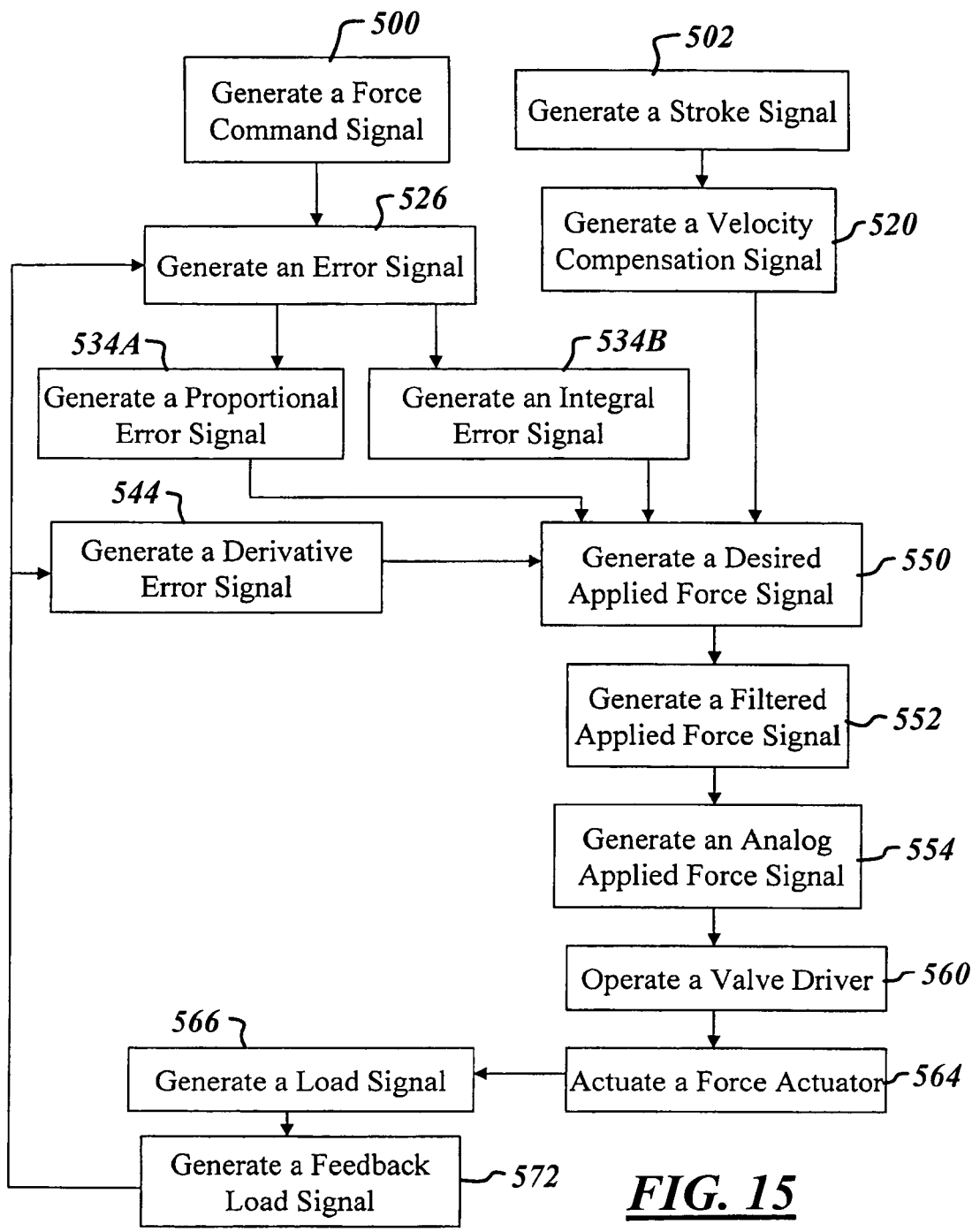
FIG. 15 is a logic control diagram illustrating another method of operating a force control system in accordance with an embodiment of the present invention.

Referring now to FIGS. 14 and 15, a block diagrammatic view of a force control system 480 and a logic control diagram illustrating a method of operating the force control system 480 and/or of applying a force on a test object are shown in accordance with yet another embodiment of the present invention. The force control system 480 includes a controller 482 that performs as a function generator. The controller 482 provides feedforward, as opposed to feedback, velocity compensation to one or more force actuators 484 (only one is shown).

In step 500, the controller 482 generates a force command signal 501, similar to the force command signal 314.

In step 502, the controller 482 also generates a displacement or stroke signal 503. The controller 482 provides velocity information to each force actuator 484. This eliminates the need for large load errors to drive the actuators. The controller 482 generates the stroke signal 503 such that the actuators are stroked in phase with the motion of the test object. The stroke signal 503 may be used to allow the actuators that are operating in a "follow" mode to displace in phase with the test object without introducing forces on the test object. When multiple actuators are used, the stroke signal 503 is typically not a function of the force command signal 501.

Figure 16:
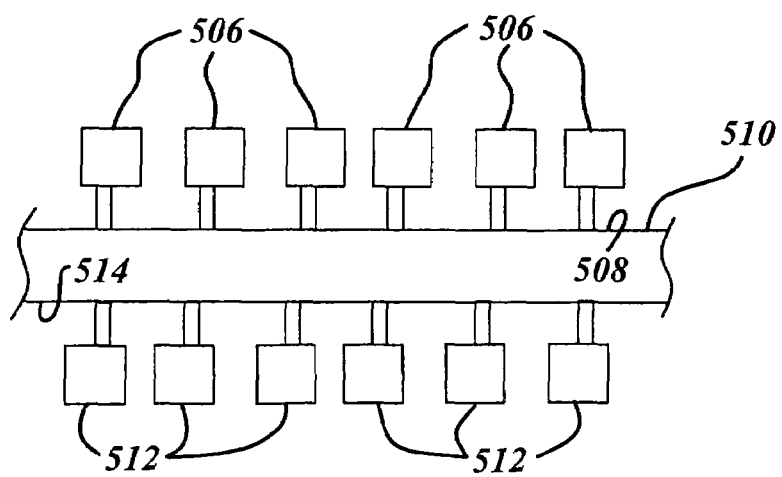
FIG. 16 is a side view of a wing having associated force applying actuators and following actuators performing in accordance with an embodiment of the present invention

Referring also to FIG. 16, and as an example, during a wing test, a first set of force actuators 506 may be coupled to a topside 508 of a wing 510. A second set of force actuators 512 may be coupled to a bottom side 514 of the wing 510. The upper actuators 506 may apply force to flex the wing 510 upward and the lower actuators 512 may apply loads to flex the wing 510 downward. The actuators that are not applying a force or that are opposing the wing motion travel along or follow the motion of the wing without loading the wing. In using a stroke signal that is separate from the force command signal, the system 480 is able to stroke the following actuators when the associated force command signal is zero. This overcomes phase lag between the test object and the force actuator.

In step 520, a feedforward compensation circuit 522, which is coupled to an output of the controller 482, differentiates the stroke signal 503 to achieve a velocity compensation signal 524.

In step 526, the force command signal 501 and a feedback load signal 528 are summed via a seventh summing junction 530 to form an error signal 532.

In step 534, the error signal 532 is separately gain adjusted via a proportional compensation circuit 536 and an integral compensation circuit 538 to generate a proportional error signal 540 and an integral error signal 542, as represented by steps 534A and 534B. The proportional circuit 536 and the integral circuit 538 are coupled to the controller 482 via the summing junction 530.

In step 544, the feedback load signal 528 is gain adjusted via a derivative compensation circuit 546 to generate a derivative load signal 548.

In step 550, the velocity compensation signal 524, the proportional error signal 540, the integral error signal 542, and the derivative load signal 548 are summed using a eighth summing junction 544 to generate a desired applied force signal 546. In step 552, the desired applied force signal 546 is filtered using a forward loop filter 553 to generate a filtered applied force signal 555. In step 554, the filtered applied force signal 555 is converted to an analog applied force signal 556 using a D/A converter 558.

In step 560, the valve driver 562 operates in response to the analog applied force signal 556. In step 564, the force actuator 484 moves in response to the fluid pressures received from the valve driver 562.

In step 566, a load sensor 568 generates a load signal 570 in response to the load on a test device as applied by the force actuator 484.

In step 572, the load signal 570 is conditioned and converted into a digital format using a signal conditioner 574 having an A/D converter.

Steps 500-574 are continuously performed until the end of a test procedure. The above-described steps are also meant to be illustrative examples; the steps may be performed sequentially, synchronously, simultaneously, or in a different order depending upon the application.

The above steps may be performed after the running of the system 480 without the use of the velocity compensation to determine the projected velocity. This projected velocity may be utilized to generate the velocity profile used or generated in step 500.

The above control adds an additional signal source, the function generator, to control the motion of the force actuators. This separate source provides piston velocity information to each hydraulic actuator, thus, eliminating the need for large load errors to drive the actuators as in traditional control systems.

In the following description, the term "decoupling" does not refer to the disconnecting of an input from an output of a force compliant mechanism. The term "decoupling" refers to the inherent separation of the input and output and the preventing of the transfer of force transients between the input and the output of a force compliant mechanism. Or in other words the preventing of the transfer of force transients between a force actuator and a test object.

Figure 17:
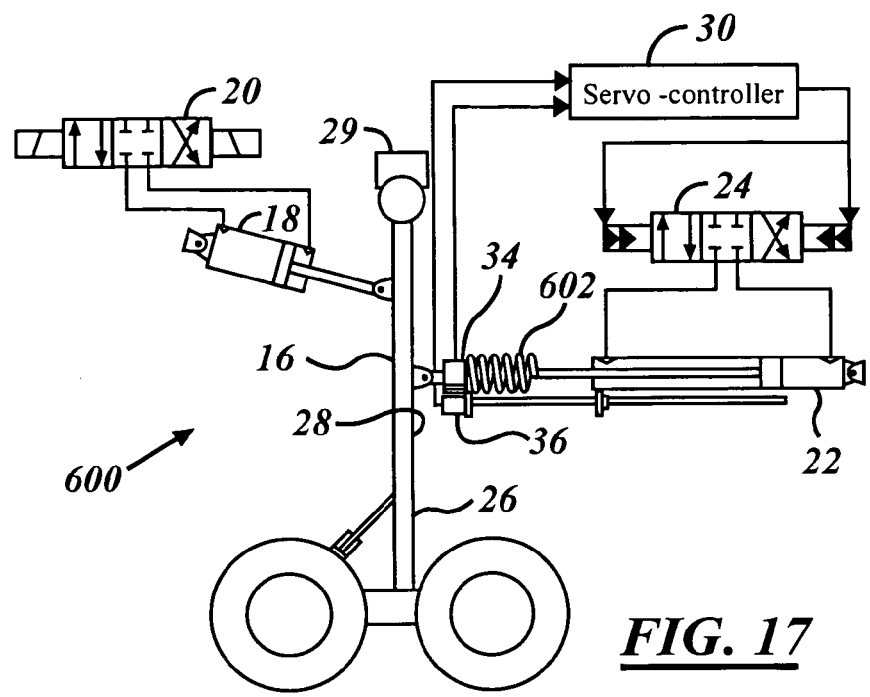
FIG. 17 is a block diagrammatic and schematic view of a portion of a force control system incorporating a force compliant coupling mechanism in accordance with another embodiment of the present invention.

Referring now to FIG. 17, a block diagrammatic and schematic view of a portion of a force control system 600 in accordance with another embodiment of the present invention is shown. The force control system 600 is similar to the force control system 10, however, a force compliant coupling mechanism 602 is incorporated between the load sensor 34 and the second actuator 22. The force compliant mechanism 602 reduces the force transients experienced by the test object 16 and the actuators 18 and 22. The force compliant mechanism 602 may be of various types and styles, some of which are shown in FIGS. 22-35.

Figure 18:
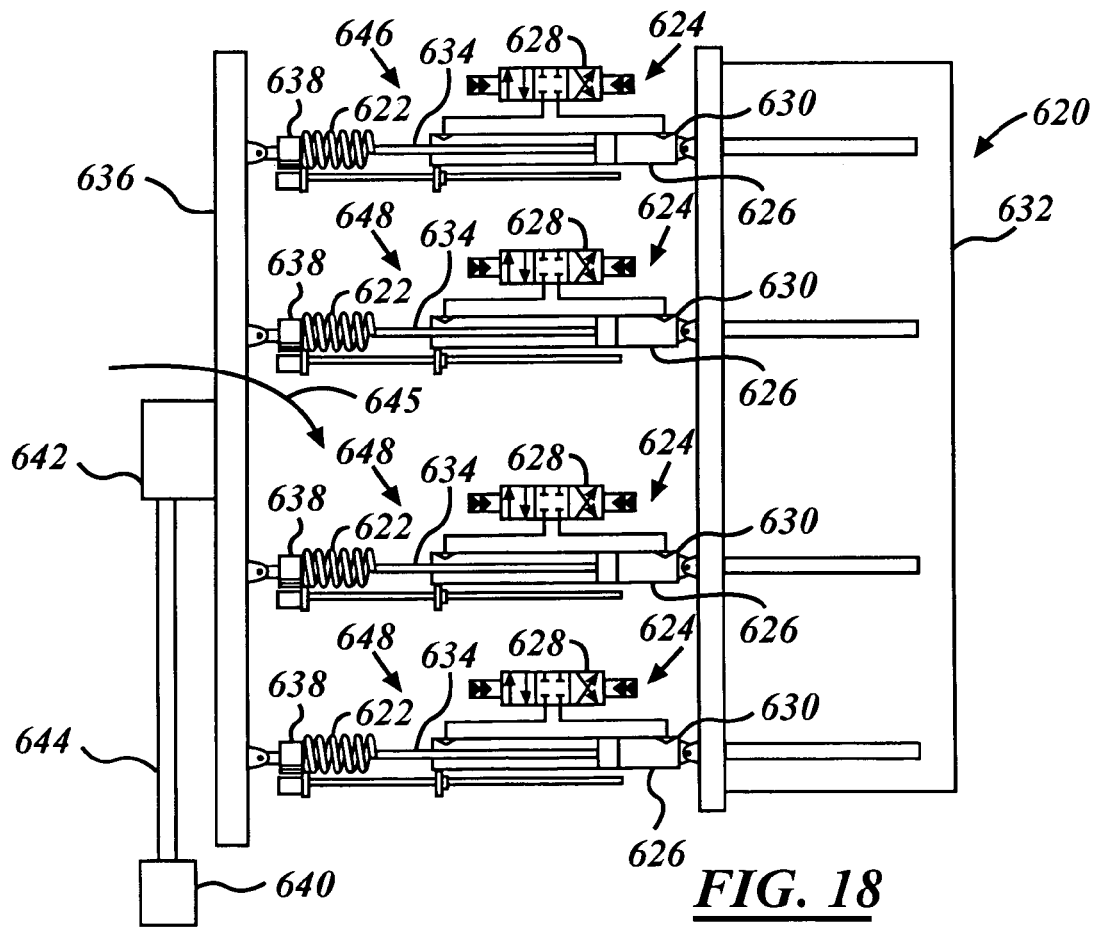
FIG. 18 is a block diagrammatic and schematic view of a portion of a force control system incorporating multiple force compliant coupling mechanisms in accordance with another embodiment of the present invention.

Referring now to FIG. 18, a block diagrammatic and schematic view of a portion of a force control system 620 incorporating multiple force compliant coupling mechanisms 622 in accordance with another embodiment of the present invention is shown. The force control system 620 includes multiple force control sub-systems 624 that each includes a load actuator 626 that has an associated servo valve 628 and a base 630 that is coupled to a test frame 632. The piston rods 634 of the actuators 626 are coupled to a leading edge slat 636 via and associated force transducers 638 and the force compliant mechanisms 622. The force compliant mechanisms 622 are coupled between the piston rods 634 and the force transducers 638. The leading edge slat 636 is displaced via a drive motor 640 and a rotary actuator 642. The rotary force actuator 642 is coupled to the leading edge slat 636 and to the drive motor 640 by use of a flex tube 644. Arrow 645 illustrates direction of travel for the leading edge slat 636. Each of the sub-systems 624 is effectively decoupled from each other sub-system contained therein, due to the use of the force compliant mechanisms 622. For example, the sub-system 646 is decoupled from the sub-systems 648.

Although the force compliant mechanisms 622 of FIGS. 17 and 18 are shown in a particular location relative to the associated force transducers 638 and force actuators 626, they may be located in other locations. For example, the force compliant mechanisms 622 may be coupled between the actuators 626 and the test frame 632, between the force transducers 638 and the leading edge slat 636, or elsewhere depending upon the application. The force compliant mechanisms 622 provide decoupling between the sub-systems 624 such that each individual system does not affect any of the other systems.

Figure 19:
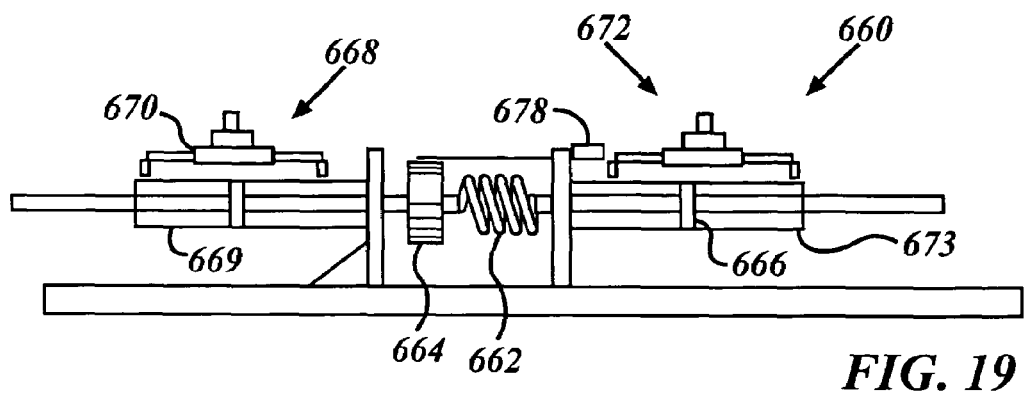
FIG. 19 is a block diagrammatic view of a force control system in accordance with another embodiment of the present invention.

Referring now to FIG. 19, a block diagrammatic view of a force control system 660 in accordance with another embodiment of the present invention is shown. The force control system 660 is similar to the actuator portion of the force control system 50. Again, however, a force compliant coupling mechanism 662 is coupled between the force transducer 664 and the test object 666. The force control system 660 includes a force actuation system 668 having a force actuator 669 and a first servo-valve 670 and a position actuation system 672 having position actuator 673 and a second servo-valve 674. The force control system 660 is mounted on a test stand 676.

Without the decoupling effect provided by the force compliant member 662, erratic or rapid motion of the position actuation system 672 tends to appear as force transients as indicated by the force transducer 664. Without the decoupling effect provided, the stability of the force actuation system 662 is limited by the gain of the position actuation system 672 and vice versa.

A position/velocity sensor 678 is coupled to the test stand 676 and is used to indicate the position of the test object 666. Although a magneto restrictive sensor is shown, other known position/velocity sensors may be utilized, some of which are stated above with respect to the position sensor 140.

Figure 20:
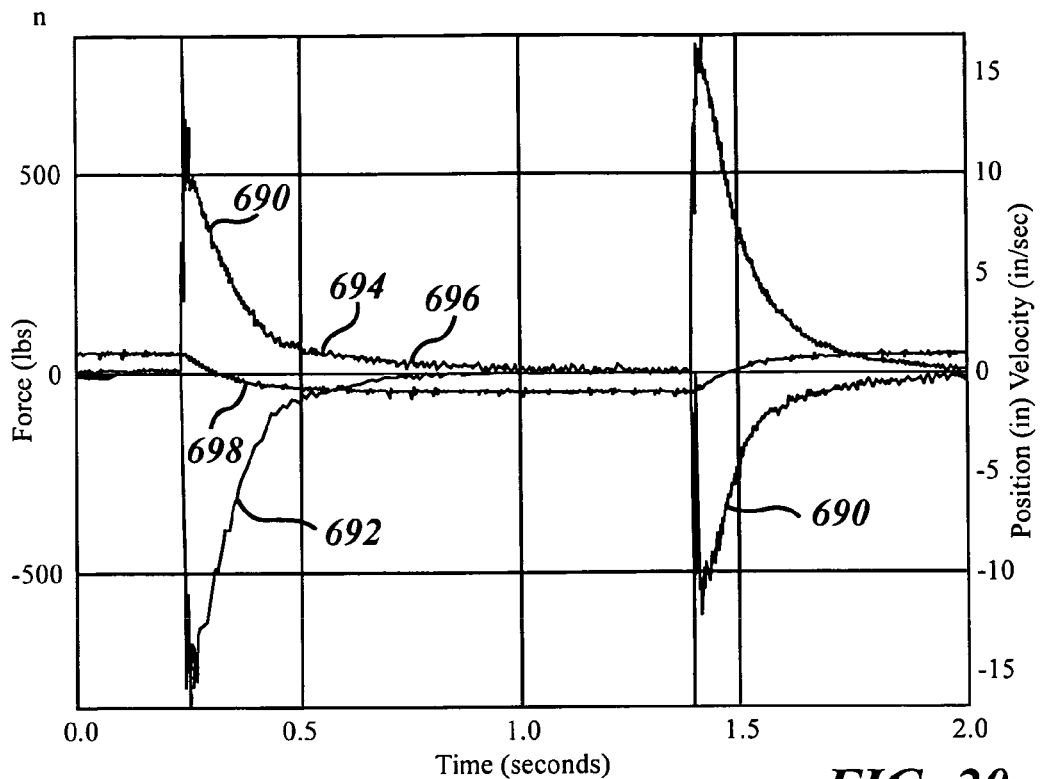
FIG. 20 is a force/position versus time plot illustrating sample force transients.

Referring now to FIG. 20, a force/position versus time plot illustrating sample force transients 690 is shown. The force transients or force excursions 690 are shown for a force control system that does not have a force compliant mechanism, as described above with respect to FIGS. 17-19. As the velocity signal 692 rapidly increases, the force signal 694 increases in the opposite direction, thus creating the force transients 690 shown. It is desired that as the velocity signal 692 increases rapidly, that the force signal 694 remains at a constant value. Note also that high frequency oscillations 696 exist on the force signal 694. Curve 698 represents position of the test object.

Figure 21:
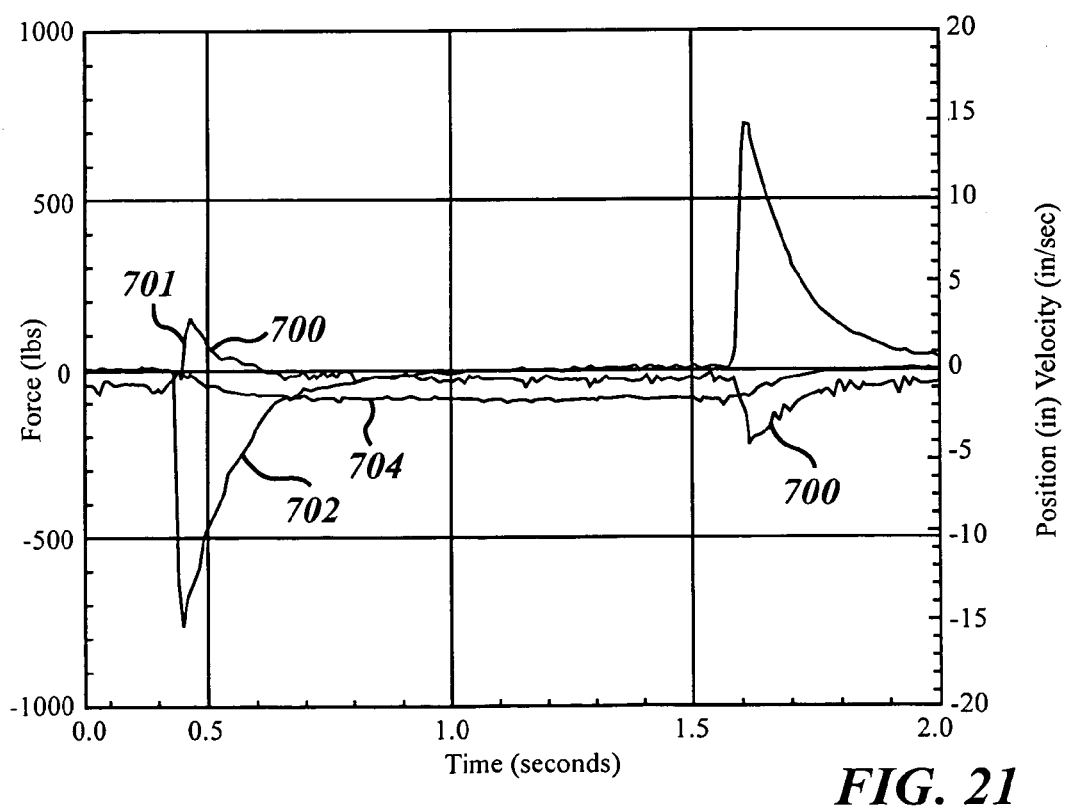
FIG. 21 is a force/position versus time plot illustrating reduced force transients due to the use of a force compliant coupling mechanism in accordance with an embodiment of the present invention.

Referring now to FIG. 21, a force/position versus time plot illustrating reduced force transients 700, of a force curve 701, due to the use of a force compliant coupling mechanism in accordance with an embodiment of the present invention is shown. By using a force compliant mechanism, the force transients 690 shown in FIG. 20 are reduced by approximately 80%. In addition, the oscillations 696 are not present, thus stability is increased. Curve 702 represents the velocity signal and curve 704 represents the position of the test object.

Figure 22:
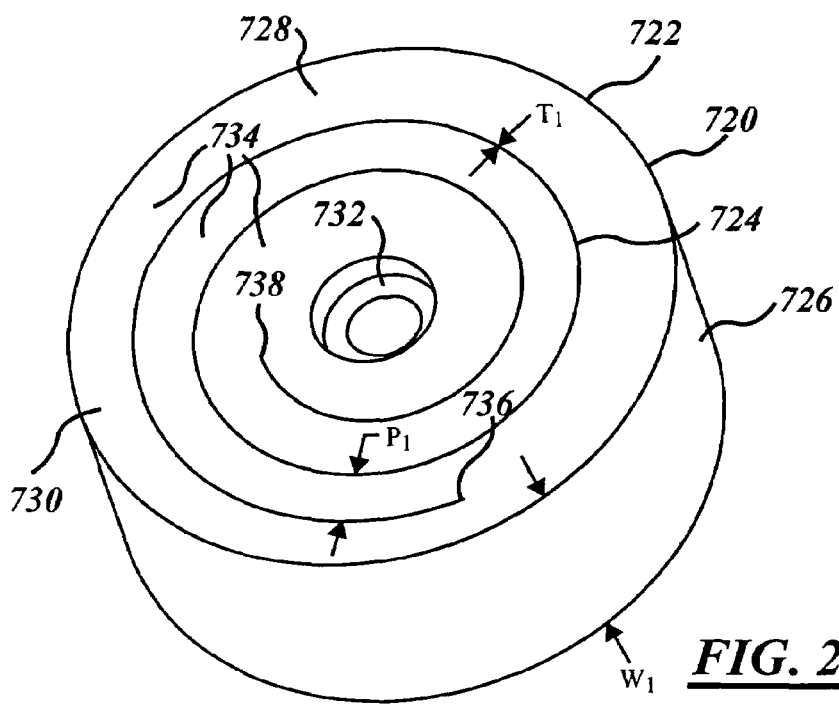
FIG. 22 is a perspective view of a sample force compliant coupling mechanism in accordance with an embodiment of the present invention.

Referring now to FIG. 22, a perspective view of a sample force compliant coupling mechanism 720 in accordance with an embodiment of the present invention is shown. The force compliant coupling mechanisms 602, 622, and 662 stated above may be in the form of or include a volute spring 722, as shown. A thin volute 724 may be cut through a segment of bar stock 726, referred to as the body, perpendicular to a flat side 728 thereof to form a spring. The cut forms spiral sections in the body. The bar stock 726 may be cut using laser, electro discharge machine (EDM), or water-jet technologies, or other technologies known in the art.

The volute spring 722 is operated by applying a force between the outside circumferential periphery 730 and the center ring portion 732. This creates a spring that resembles a cantilevered beam, which has been rolled-up to form a circular spring element. The thickness $T_1$ of the cut 724 may vary per application and depend on the accuracy of motion requirements of the volute spring 722. In one embodiment of the present invention, the cut 724 is approximately 0.015" thick. For a given pitch $P_1$, the width $W_1$ of the volute spring 722 may be increased to provide greater stiffness. In general, the stiffness of the volute spring 722 is approximately proportional to the pitch for a given thickness and is approximately proportional to the thickness cubed for a given pitch. The pitch refers to the thickness of the spiral sections 724. By adjusting the pitch $P_1$, width $W_1$, and length of the volute spring 722 the desired stiffness and deflection is obtained for a given material strength. The length of the volute spring refers to the length of the material of the volute spring if the volute spring were to be unrolled and laid flat. The length is the distance between the outer initial point 736 and the inner end point 738. The volute spring 722 may be formed of various metallic and non-metallic materials, such as steel, spring steel, titanium, and plastic.

Figure 23:
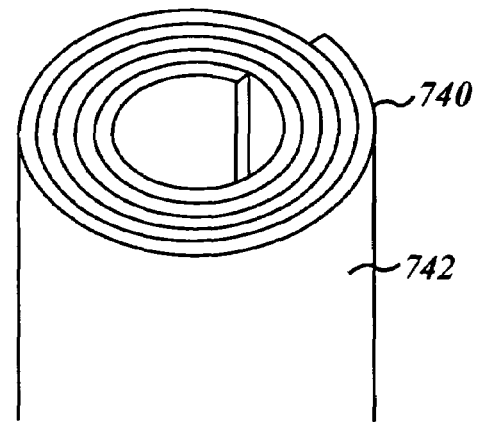
FIG. 23 is a perspective view of a force compliant coupling mechanism in accordance with another embodiment of the present invention.

Referring now to FIG. 23, a perspective view of another sample force compliant coupling mechanism 740 in accordance with another embodiment of the present invention is shown. The force compliant mechanism 740 is also shown as volute spring. The force compliant mechanism 740 is formed of a section of flatbar 742 that is rolled-up.

Figure 24:
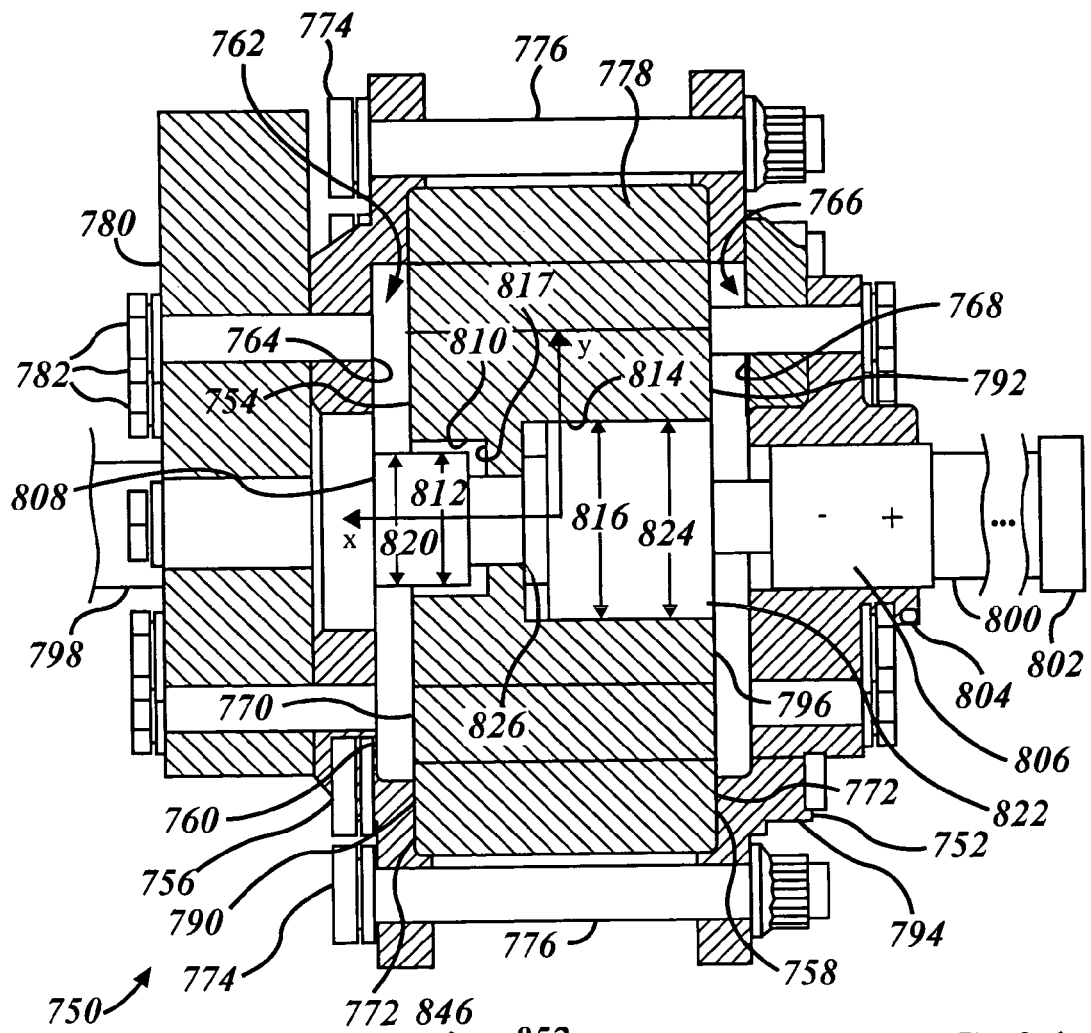
FIG. 24 is a side cross-sectional view of another sample force compliant coupling mechanism in accordance with yet another embodiment of the present invention.

Referring now to FIG. 24, a side cross-sectional view of another sample force compliant coupling mechanism 750 in accordance with yet another embodiment of the present invention is shown. The force compliant mechanism 750 includes a housing 752 and a force compliant volute spring member 754 disposed therein. The housing 752 includes an input plate 756, an output plate 758, and an extension chamber 760 therebetween. The volute spring 754 is deposed and held in place between the input plate 756 and the output plate 758. The extension chamber 760 consists of a first recessed section 762 on an inner side 764 of the input plate 756 and a second recessed section 766 on an inner side 768 of the output plate 758. In operation, the inner spiral sections 770 of the volute spring 754 displace within the extension chamber 760 on each flat side 772 of the volute spring 754 and within the recessed sections 762 and 766. The plates 756 and 758 are coupled to each other and separated by tie rods 774 having spacers 776. The outer periphery 778 of the volute spring 754 is exposed between the tie rods 774. A force transducer 780 is coupled to the input plate 756 via fasteners 782.

The volute spring 754 has an input end 790 and an output end 792. The input end 790 corresponds to an outer most spiral section 794 of the volute spring 754 and the output end 792 corresponds with the inner most spiral section 796 of the volute spring 754. Of course, this arrangement may be switched such that the input end 790 refers to the inner spiral section 796 and the output end 792 refers to the outer spiral section 794. The input end 790 is coupled to the input plate 756 or between the input plate 756 and the output plate 758, as shown.

A force actuator input shaft 798 is coupled to the force transducer 780 and is displaced in response to a force induced thereon. An output shaft 800 is coupled to the output end 792 and to a test object 802. A flexible lubricated bushing 804 is coupled to the output plate 758. The shaft end 806 of the output shaft 800 extends and slides through the bushing 804. The output shaft 800 is coupled to the volute spring 754 via a cap screw 808.

The volute spring 754 also has a first inner section 810 having a first inner coupling diameter 812 and a second inner section 814 having a second inner coupling diameter 816. The cap screw 808 is coupled to or is in coupled operation with the first section 810. The output shaft 800 is coupled to or is in coupled operation with the second section 814. The inner spiral section 796 of the volute spring 754 includes a divider 817 that separates the first section 810 and the second section 814. The cap screw 808 may have a first outer diameter 820 that corresponds with the first inner diameter 812 for insertion into the first section 810. A swivel 822 may be coupled to the shaft end 806 and have an outer diameter 824 that corresponds with the second inner diameter 816 for insertion into the second section 814. The cap screw 808 is coupled to the swivel 822 through an inner hole 826 in the divider 817. The swivel 822 prevents binding between spiral sections of the volute spring and allows for energy absorption in x and y directions. The cap screw 808 is one example of an attachment element that may be used to attach the volute spring 754 to the output shaft 800.

The force compliant mechanism 750 provides one degree-of-freedom motion while restraining the other two degrees of freedom. For the example embodiment shown, the force compliant mechanism 750 allows for motion along the z-axis and prevents motion along the x-axis and y-axis. Although the volute spring 754 is designed such that it does not bottom out on the plates 756 and 758, cushions (not shown) maybe attached to the inner sides or to the volute spring to account for extreme conditions. The cushions may be formed of elastomeric material or other suitable materials known in the art.

Although the housing 752, the volute spring 754, and the force transducer 780 are shown in a particular horizontal coupling order or arrangement, this arrangement may vary per application. Also the manner in which the stated components are attached to each other may also vary. For example, a test object may be coupled directly to the output plate 758 rather than through the use of the output shaft 800. A bushing, similar to the bushing 804, may be coupled to the input plate 756. A force transducer 780 may be screwed into the bushing and have an input shaft coupled thereto. In this manner, the housing 752 moves in unison with the test object, as opposed to independently as is the case with the illustrated embodiment shown in FIG. 24.

Figure 25:
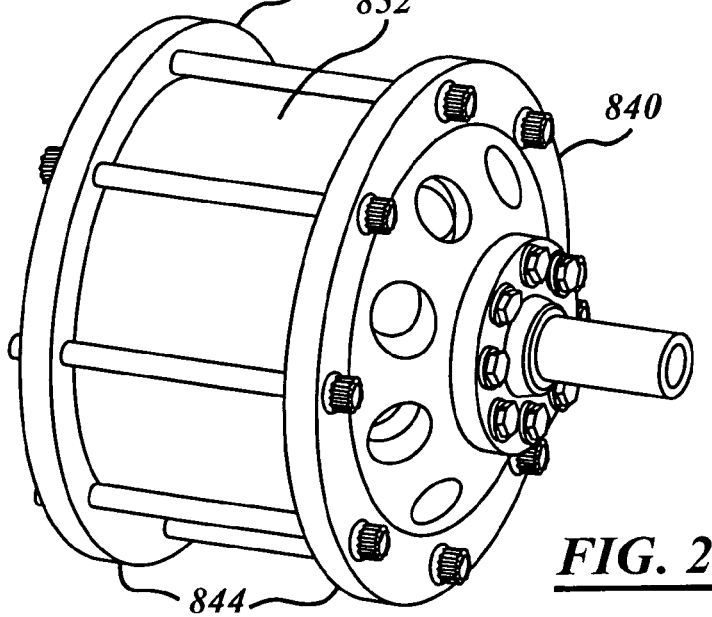
FIG. 25 is a perspective view of another sample force compliant coupling mechanism in accordance with still another embodiment of the present invention.
Figure 26:
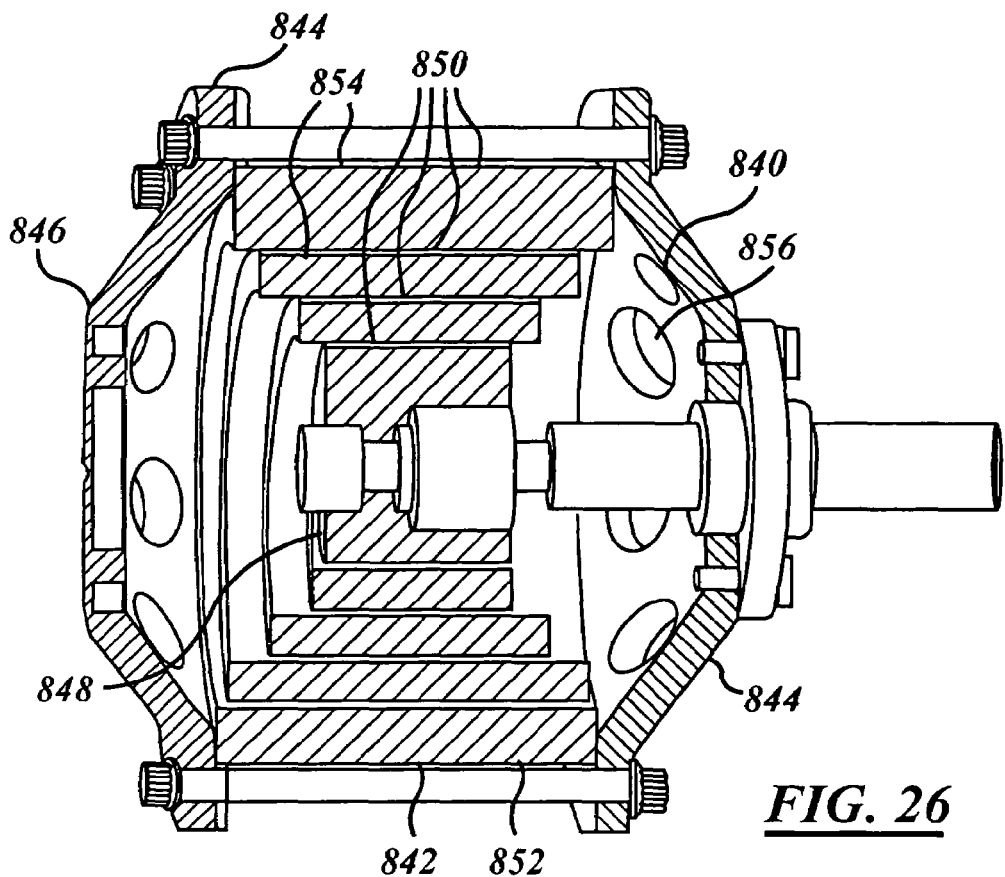
FIG. 26 is a side cross-sectional view of the force compliant coupling mechanism of FIG. 25 illustrating the incorporation of a tapered volute.

Referring now to FIGS. 25 and 26, a perspective and side cross-sectional view of another sample force compliant coupling mechanism 840 having a tapered volute 842 in accordance with still another embodiment of the present invention is shown. The compliant coupling mechanism 840 is similar to the compliant coupling mechanism 750. The compliant coupling mechanism 840 incorporates the tapered volute spring 842 instead of a uniform width volute spring, as with the compliant coupling mechanism 750. The tapered spring 842 extends within conical-shaped plates 844 of the housing 846 or the conically-shaped portions of the housing 846. The tapered spring 842 allows for increased displacement of the center section 848 of the volute spring 842 within the housing 846 and has reduced weight in comparison with a uniform width volute spring of approximately the same size and equal stiffness. The tapered spring 842 has spiral sections 850 with decreasing width between the outer periphery 852 and the center section 848.

The tapered spring 842 experiences a constant level of stress along the length of the volute. The tapered design of the spring 842 minimizes the mass while providing improved compliance versus size of the spring. The conical shape of the plates 844 further allows for increased extension of the spring 842. The compliance for force transient reduction may be selected to be approximately 10% of the corresponding force actuator stiffness, in order to reduce force transient amplitudes by approximately 90%. This selection may vary depending upon the amount of force transient reduction desired. The stiffness of the tapered spring 842 may be further adjusted by restraining motion of one or more of the spiral sections 850. For example, one or more of the outer spiral sections 854 may be restrained through the use of annular spacers (not shown) disposed within the expansion chamber 856. The annular spacers may be in the form of washers that provide restraint of the motion of the outer portion or sections 854. It may be best visualized with respect to the volute spring 754 that has a constant cross section. The washers may overlay some portion of the beginning of a spiral cut of a volute spring on the inner diameter ID of the washer and be coincident with the volute outer diameter (OD). The inner and outer faces of the washer may be in contact with the volute spring and the housing, respectively. The use of this type of adjustment provides a change in stiffness without remanufacturing all of the components. this would be the case if the same assembly was to be used in another or the same system with substantially higher loads) As another example a bolt (not shown) may be thread into, coupled to, or used to apply pressure on one or more of the outer spiral sections 854, thereby restraining the selected outer spiral sections 854 or portions thereof as desired. There is an infinite amount of placement points for the bolt, and thus there is an infinite stiffness adjustment capability.

Figure 27:
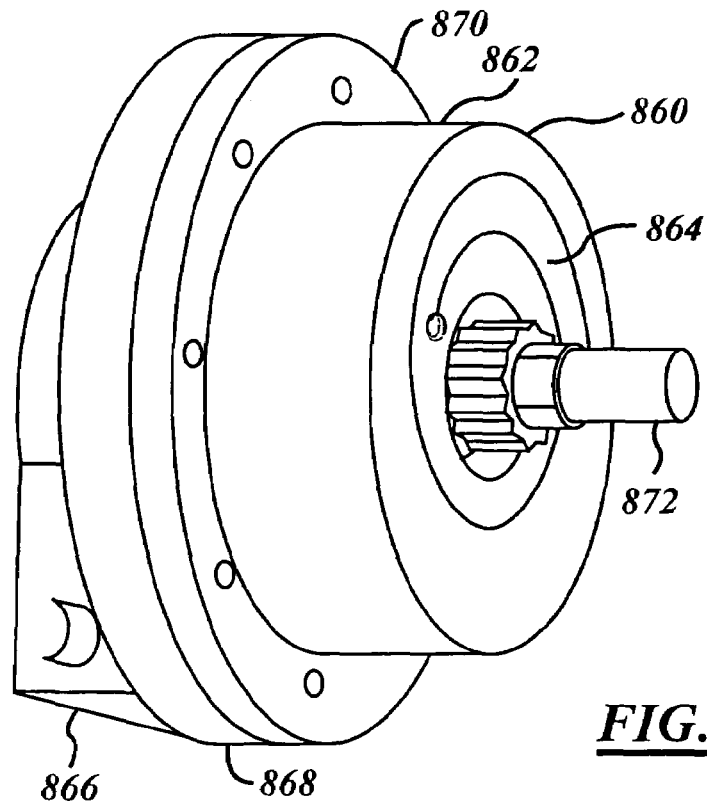
FIG. 27 is a side perspective view of another sample force compliant coupling mechanism in accordance with another embodiment of the present invention.
Figure 28:
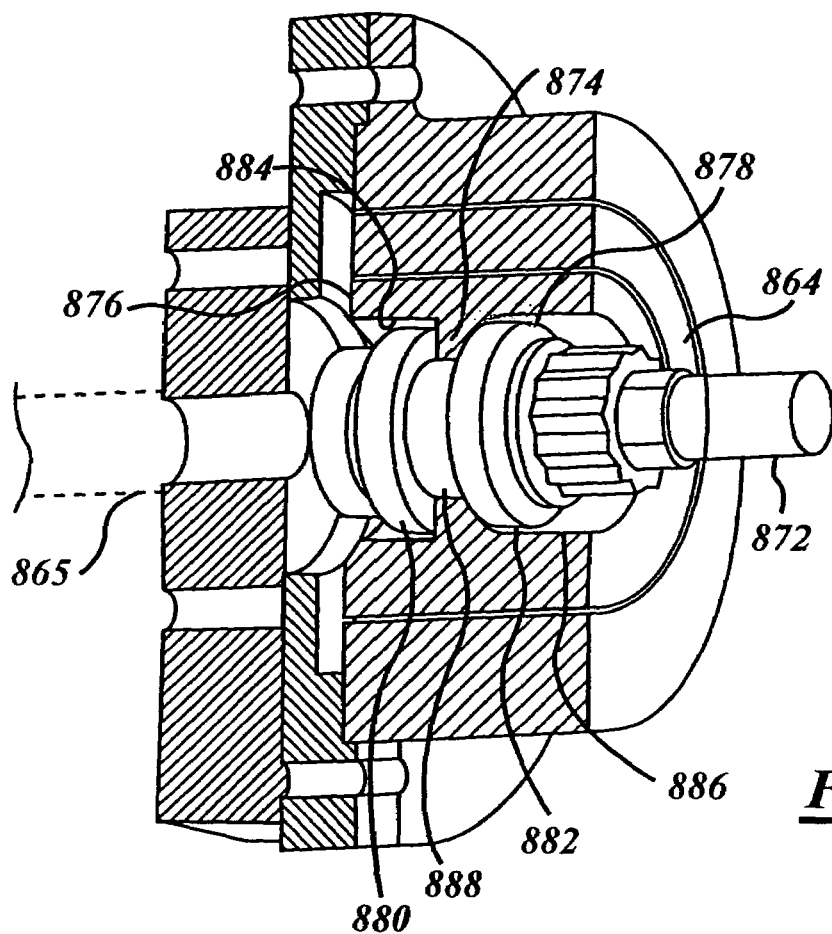
FIG. 28 is a side perspective cross-sectional view of the force compliant coupling mechanism of FIG. 27.

Referring now to FIGS. 27 and 28, a side perspective view and a side perspective cross-sectional view of another sample force compliant coupling mechanism 860 in accordance with another embodiment of the present invention is shown. The force compliant mechanism 860 includes a housing 862 and a volute spring 864. The housing 862 and the volute spring 864 are integrally formed as a single unit. The housing 862 is coupled to a force transducer 866 via an annular adaptor flange 868. The housing 862 has a mounting flange 870 that is attached to the adaptor flange 868 via fasteners (not shown). An output shaft 872 is coupled to a divider 874 of a center section 876 of the volute spring 864. The output shaft 872 is coupled to the divider 874 through use of an alignment bushing 878.

The alignment bushing 878 maintains the alignment of the output shaft 872 with respect to the volute spring 864. The alignment bushing 878 also allows the volute spring 864 to tilt without binding an input shaft 865 on the force transducer 866. The alignment bushing 878, in the embodiment shown, has a shape similar to that of a spool. The alignment bushing 878 has a front annular section 880 and a rear annular section 882 that are disposed within the first/input section 884 and the second/output section 886 of the volute spring 864, respectively. The front section 880 and the rear section 882 are attached to each other by a center annular section 888, which extends through the divider 874.

Figure 29:
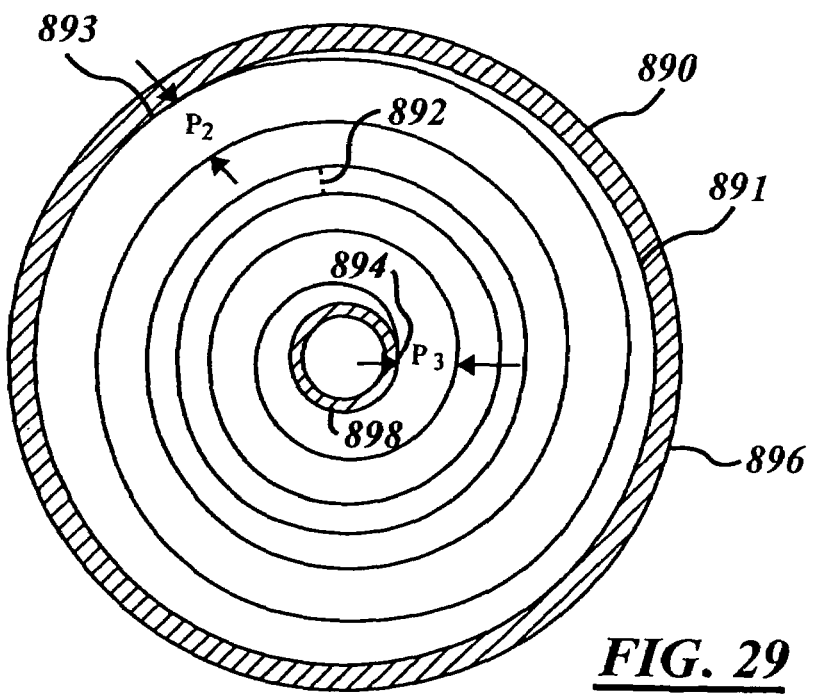
FIG. 29 is a side view of a sample variable pitch force compliant coupling mechanism in accordance with another embodiment of the present invention.

Referring now to FIG. 29, a side view of a sample variable pitch force compliant coupling mechanism 890 in accordance with another embodiment of the present invention is shown. The design of the variable pitch mechanism 890 evenly distributes stress throughout a volute spring element 891. The pitch of the spring element 891 gradually increases from an initial point 893 to a first/outer maximum initial pitch $P_2$ and then gradually narrows to a center of length point 892. From the center point 892 the thickness gradually increases to a second/inner maximum end pitch $P_3$. The pitch of the spring element 891 then gradually decreases to an end point 894. In other words, the pitch of the spring changes along its length such that the pitch decreases to approximately half of its pitch (or other desired thickness) from the initial maximum pitch $P_2$ to approximately half way down the length of the spring or to the center point 892. This design provides a force coupling mechanism with reduced weight and provides increased compliance per weight and volume. The force compliant mechanism 890 has an outer support ring 896 and an inner support ring 898 as shown. The rings 896 and 898 prevent the unraveling and are used to maintain the shape of the spring element 891. The variable pitch is useful for applications where the two ends of the volute are constrained along the axis of the input and output shafts, experienced stress levels are high, and it is desired that weight and size of the force compliant mechanism be minimized. This example shows the unique capability of this method of manufacture so that approximately the entire volute spring is under constant stress. Thus, the volute spring is better utilized per its weight and size. When the pitch of the volute spring is smallest at the center point 892, a constant stress is created when the rings 896 and 898 are restrained to move perpendicular to their relaxed mode plane. In the case when the outer ring 896 is restrained but not the inner ring 898, a continuous pitch taper or a parabolic pitch taper may be used to provide a constant stress throughout. The parabolic pitch taper provides a more constant or uniform stress over the volute spring than the continuous pitch taper. The stated dimensions are possible with this unique method of manufacture.

Figure 30:
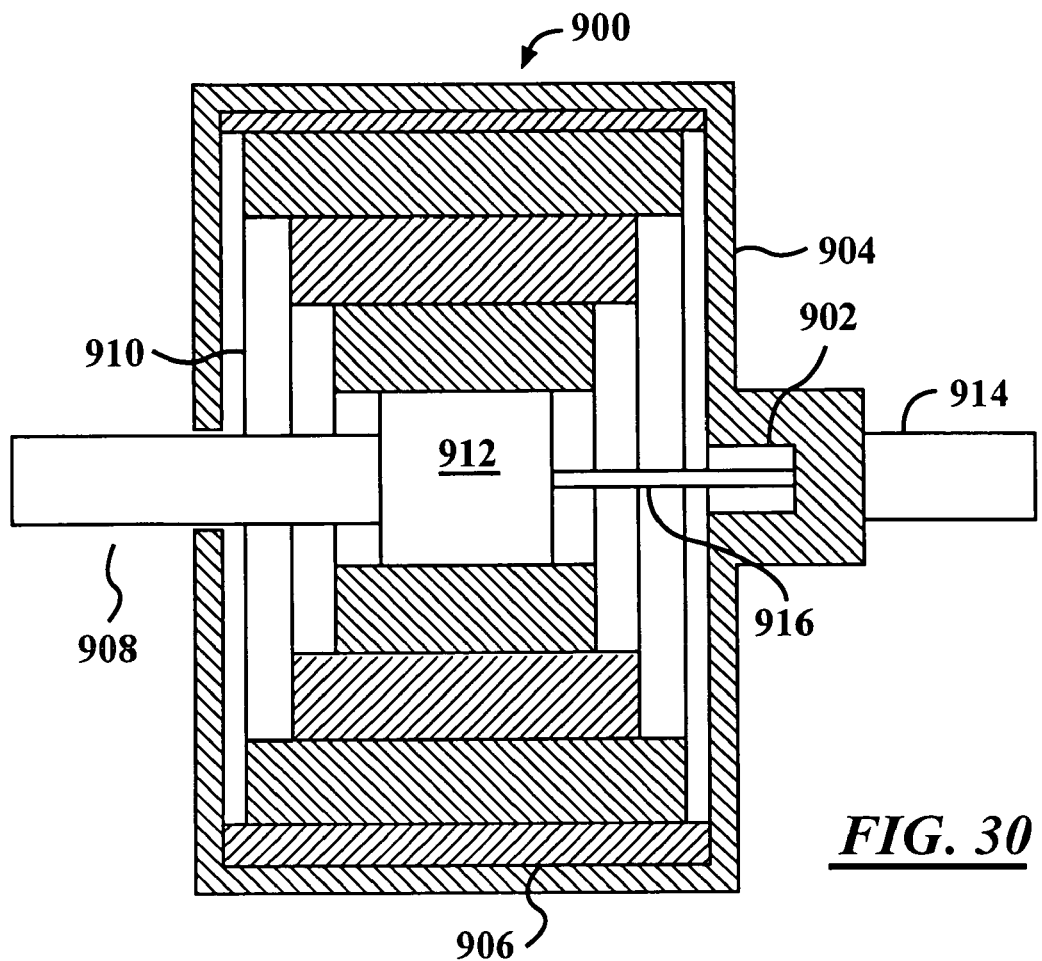
FIG. 30 is a side cross-sectional view of another sample force compliant coupling mechanism incorporating a position sensor therein and in accordance with another embodiment of the present invention.

Referring now to FIG. 30, a side cross-sectional view of another sample force compliant coupling mechanism 900 incorporating a sensor 902 therein and in accordance with another embodiment of the present invention is shown. The force compliant mechanism 900 includes a support housing 904 and a tapered volute spring 906 disposed therein. An input shaft 908 extends into the housing 904 and is coupled to the inner most spiral section 910 of the volute spring 906 via a connector 912. An output shaft 914 is coupled to and extends away from the housing 904. The connector 912 is further coupled to a sensor rod 916, which in turn is coupled to the sensor 902 that is disposed within the housing 904. Of course, various other sensor arrangements may be utilized. This design incorporating a force compliant mechanism and a sensor in a single assembly that provides a compact, lightweight, and short in length assembly. The sensor 902 may be a position sensor, a force sensor, a velocity sensor, an acceleration sensor, or other applicable sensor known in the art. When a force sensor is used, the force sensor may include strain gages (not shown) mounted on the volute spring 906 and used to measure bending stress.

The above-described volute spring sample embodiments allow for both tension and compression forces with a single degree-of-freedom of motion.

Figure 31:
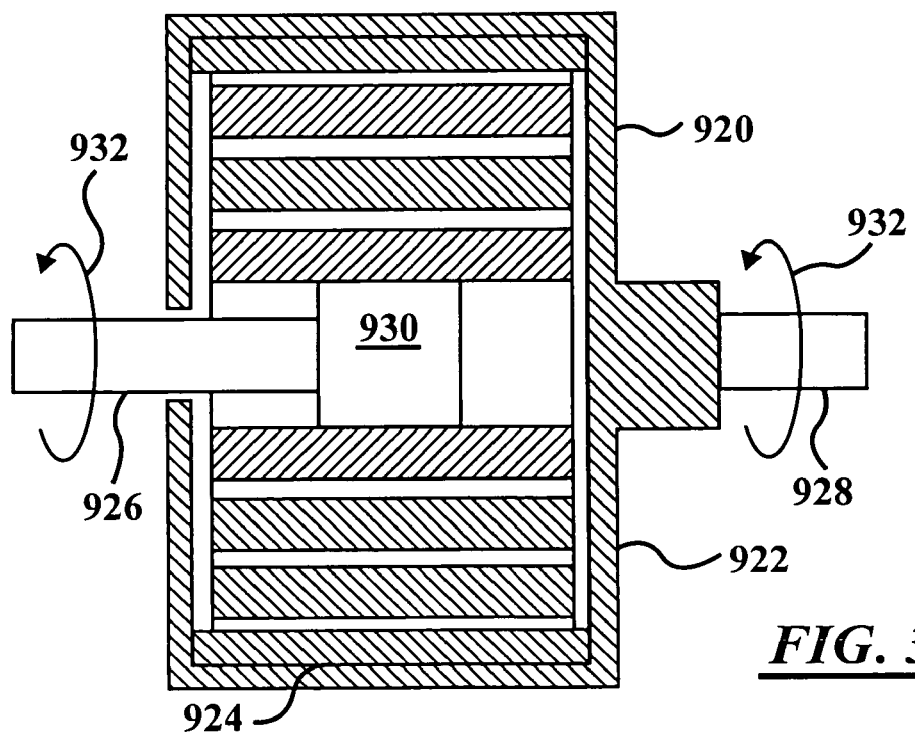
FIG. 31 is a side cross-sectional view of a force compliant coupling mechanism configured for a torsional application and in accordance with another embodiment of the present invention.

Referring now to FIG. 31, a side cross-sectional view of a force compliant coupling mechanism 920 configured for a torsional application and in accordance with another embodiment of the present invention is shown. The force compliant mechanism 920 includes a housing 922 having a uniform width volute spring 924 therein. An input shaft 926 and an output shaft 928 extend within and out of the housing 922. The input shaft 926 is coupled to the volute spring 924 via a center connector 930. The output shaft 928 is coupled to the housing 922. The volute spring 924 and the shafts 926 and 928 are capable of withstanding large torques and provide rotational motion, translational motion, or a combination thereof. Rotational motion is shown by the arrows 932. Input and output of the force compliant mechanism 920 may be systematically constrained to be collinear and/or provide some misalignment capability.

The torsional design of the force compliant mechanism 920 may be used to decouple the input shaft 926 from the output shaft 928 to increase stability. The torsional design may also be used to supply energy to an output mechanism (not shown) that has an erratic rotational motion and yet a constant torque input.

The above-mentioned volute springs and/or the compliant coupling mechanisms may also be used as a force transducer, thus reducing instrumentation requirements. The stress/strain relationship within the volute springs may be measured with a strain gage to get a force output, or a position sensor may be used to provide the force in accordance with Hookes law. This is considered when there is a limited distance between the force actuator-end and the test specimen.

The compliant coupling mechanisms 750 and 840 provides a failsafe feature. The construction of the compliant coupling mechanisms 750 and 840 is such to maintain attachment of each end of the volute springs 754 and 842 even when the springs have a break. This increases operating safety and function of the compliant coupling mechanisms.

Figure 32:
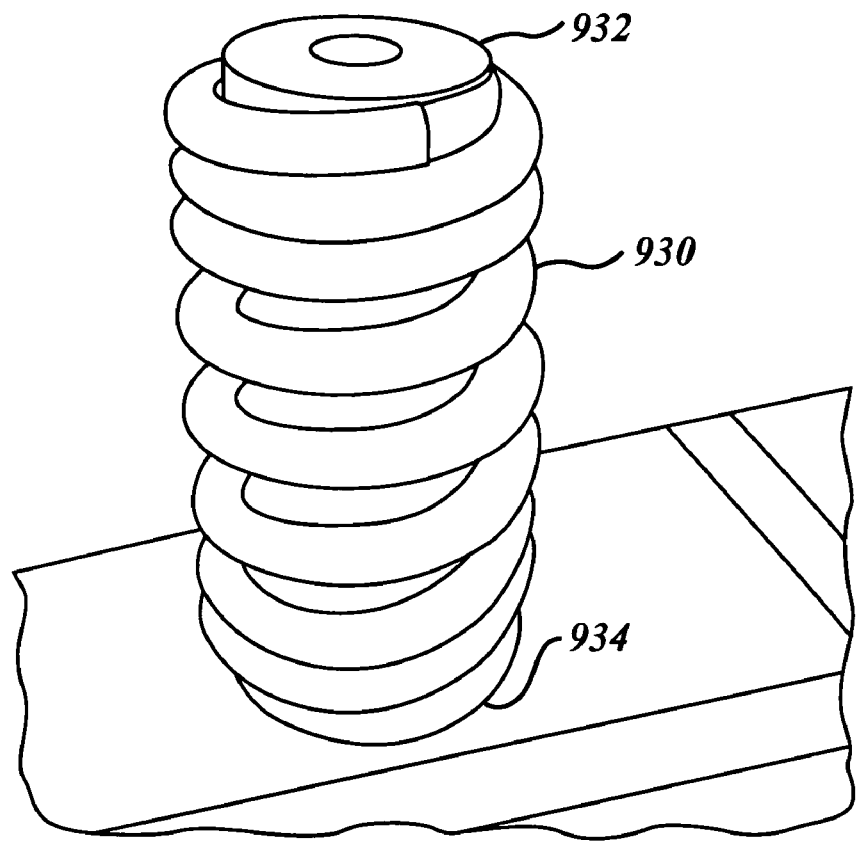
FIG. 32 is a perspective view of a coil spring in accordance with an embodiment of the present invention.

Referring now to FIG. 32, a perspective view of a coil spring 930 in accordance with an embodiment of the present invention is shown. The coil spring 930 is another example of a force compliant mechanism that may be utilized to absorb force transients within a force control system. The spring 930 includes an upper plate 932 and a lower plate 934 for coupling thereto. The spring 930 may be used in both tension and compression applications.

Figure 33:
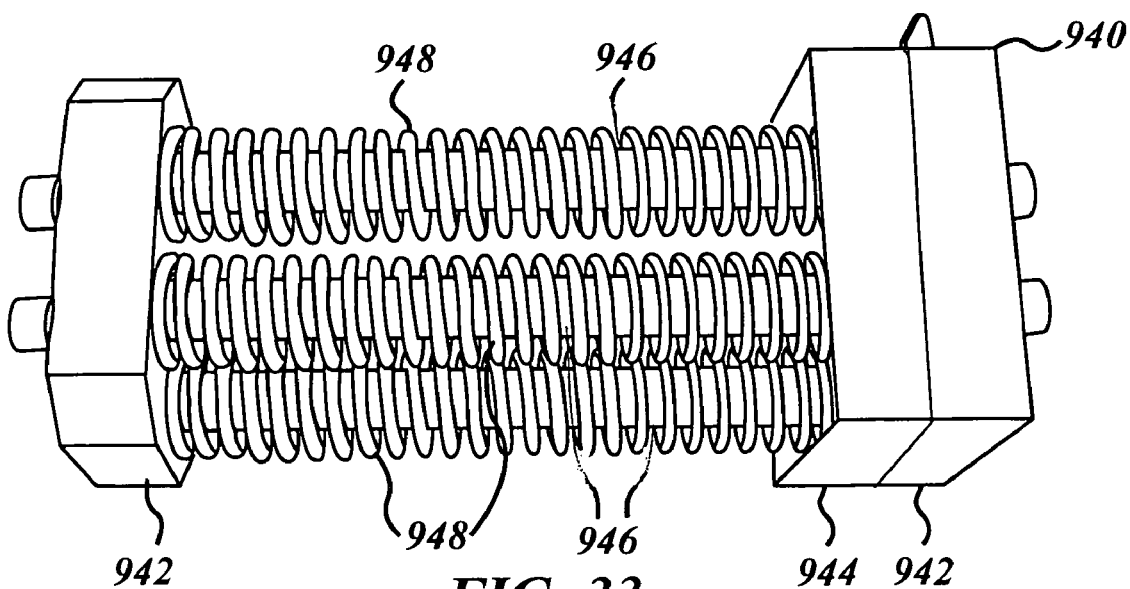
FIG. 33 is a perspective view of a force compliant coupling mechanism incorporating having multiple coil spring configuration in accordance with an embodiment of the present invention.

Referring now to FIG. 33, a perspective view of a force compliant coupling mechanism 940 incorporating a multiple coil spring configuration in accordance with an embodiment of the present invention is shown. The force compliant mechanism 940 includes a pair of outer blocks 942 and an inner block 944. The outer blocks 942 are coupled to each other via multiple rods 946. The inner block 944 slides on the rods 946 between the outer blocks 942. The rods 946 extend within springs 948 that are located on a single side of the inner block 944. The inner block 944 provides compliance in tension. The outer blocks 942 may be used as the input and the inner block 944 may be used as the output or vice versa. The force compliant mechanism 940 is suitable for applications where small accelerations and high loads and spring rates are experienced.

Figure 34:
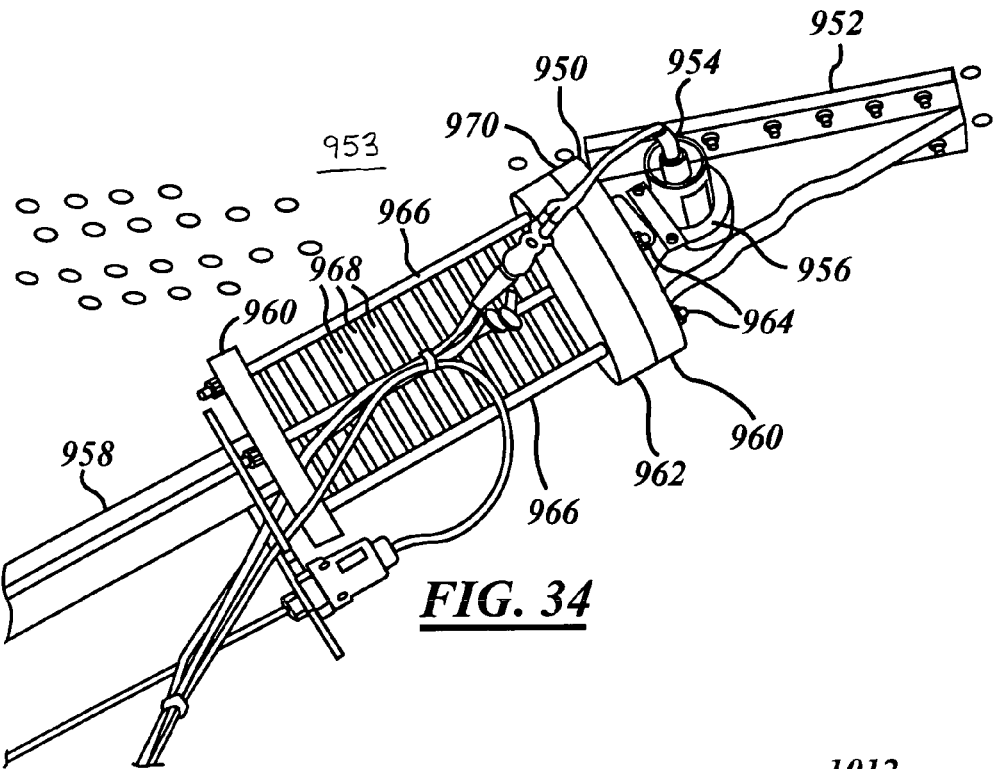
FIG. 34 is a perspective view of a washer-based force compliant coupling mechanism in accordance with an embodiment of the present invention.

Referring now to FIG. 34, a perspective view of a washer-based force compliant coupling mechanism 950 in accordance with an embodiment of the present invention is shown. This design provides greater range of spring rate. The washer mechanism 950 includes a test object-mounting bracket 952 that is attached to the test object 953. A clevis pin force transducer 954 is coupled to the test object-mounting bracket 952 and to a spring output bracket 956. The spring output bracket 956 is coupled to the washer mechanism 950, which in turn is coupled to an input shaft 958.

The washer mechanism 950 includes a pair of outer plates 960 and an inner plate 962. The outer plates 960 are coupled to each other via tie rods 964 having spacers 966. The inner plate 962 is coupled to the input shaft 958 and slides on the tie rods 964. Multiple washers 968 are disposed between one of the outer plates 960 and the inner plate 962 on the input shaft 958. As the input shaft 958 is pulled away from the test object, the inner plate 962 compresses the washers 968. This system provides unidirectional compliance. Thus, in order to provide compliance in tension and compression two of the washer mechanism 950 would be utilized coupled in opposite directions. In tension, the inner plate 962 is coupled to the test object and the outer plate 970, nearest the inner plate 962, is coupled to the input shaft 958.

Figure 35:
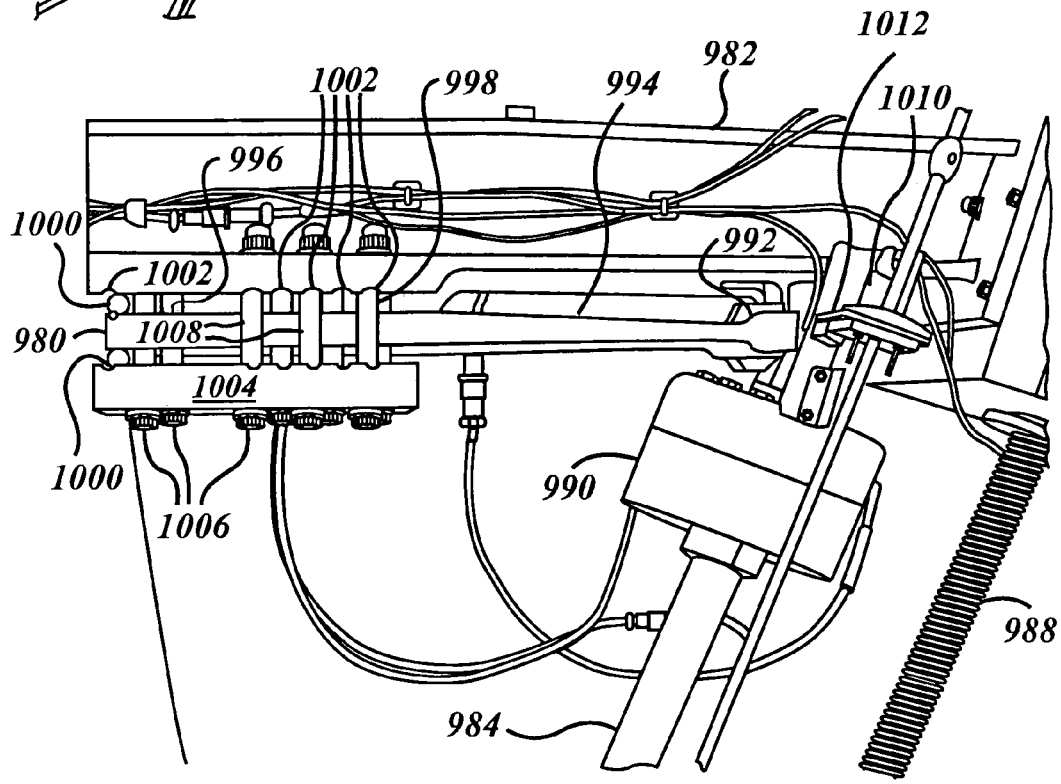
FIG. 35 is a perspective view of another force compliant coupling mechanism having a cantilever spring configuration in accordance with another embodiment of the present invention.

Referring now to FIG. 35, a perspective view of a force compliant coupling mechanism 980 having a cantilever spring configuration in accordance with another embodiment of the present invention is shown. The cantilever mechanism 980 includes a test object 982 that is coupled to a force actuator (not shown) via an input shaft 984 and to a position actuator (not shown) via a ball-screw 988. The input shaft 984 is coupled to a force transducer 990, which in turn is coupled to a suspended end 992 of a cantilever beam 994. The non-suspended end 996 of the cantilever beam 994 is coupled to the test object 982. The non-suspended end 996 is coupled between forward fulcrum pins 998 and between rearward fulcrum pins 1000. The pins 998 and 1000 are located above and below the non-suspended end 996 and are held in slots 1002 within the test object 982 and a supporting plate 1004 coupled thereto. The supporting plate 1004 is coupled to the test object 982 via tie rods 1006 having spacers 1008. The forward fulcrum pins 998 may be shifted to different slots to change the compliance of the force compliant mechanism 980. A velocity transducer 1010 is coupled to the test object 982 via a mounting bracket 1012. In general, the cantilever spring configuration may be used when the mass and the moment of the spring do not adversely affect the test object.

Figure 36:
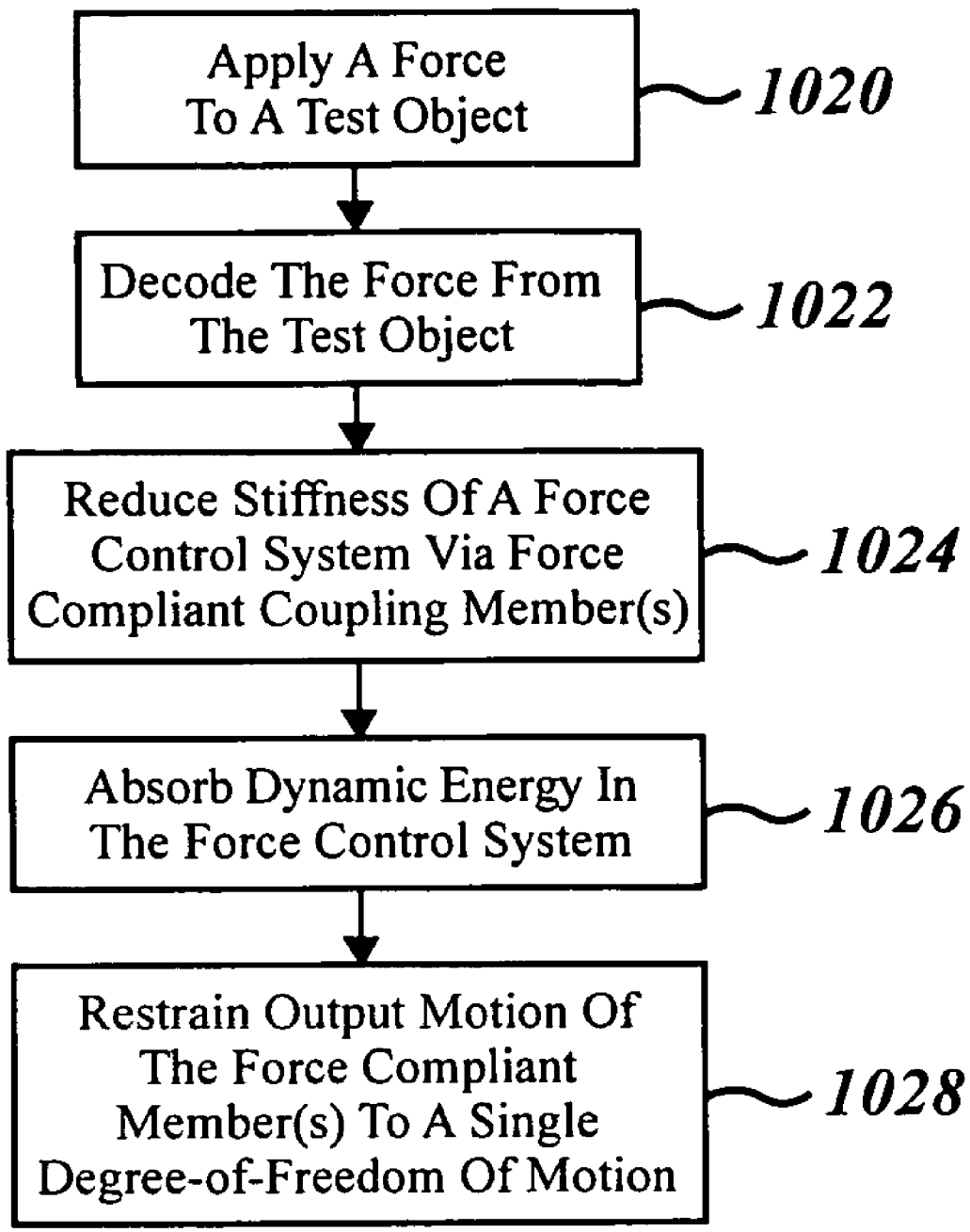
FIG. 36 is a logic flow diagram illustrating a method of reducing force transients within a force control system in accordance with an embodiment of the present invention.

Referring now to FIG. 36, a logic flow diagram illustrating a method of reducing force transients within a force control system in accordance with an embodiment of the present invention is shown.

In step 1020, a force is applied on a test object via one or more force actuators, such as the actuators 18, 842, and 669 of the force control system.

In step 1022, the force actuators are decoupled from the test object. In step 1024, the overall stiffness of the force control system is reduced via one or more force compliant members, such as the members 602, 622, 662, 720, 740, 750, 840, 860, 890, 900, 920, 930, 940, 950, and 980, that are coupled to the force actuators and the test object. In step 1026, dynamic energy in the force control system is absorbed via the force compliant members. In step 1028, the output motion of the force compliant members is restrained to a single degree-of-freedom of motion.

Steps 1020-1028 may be continuously performed until the end of a test procedure. Steps 1020-1028 are also meant to be illustrative examples; the steps may be performed sequentially, synchronously, simultaneously, or in a different order depending upon the application. In several embodiments of the present invention two or more or all of steps 1020-1028 are performed simultaneously. Steps 1020-1028 may be performed in combination with steps 250A-278B or in combination with steps 500-572.

The present invention delivers or absorbs energy in dynamic force and torque control applications. In applications where the change in force or torque is relatively low in bandwidth compared to the motion of the driven article, a smooth force or torque is delivered via the energy stored in the compliant mechanism.

The present invention provides tension, compression, and/or torsional compliance a decoupling in a lightweight and simple design. The decoupling effects of the force compliant mechanisms of the present invention are beneficial for general industrial applications, laboratory testing, robotics, and vehicular applications, such as vehicular suspension, axel-frame suspension, and seat suspension applications, due to the increased stability and reduced force transient excursions. Robotic applications may refer to those applications where position is not controlled proportionally and endpoint application must be softened dynamically. The force compliant mechanism provides an increased effective damping ratio within the force control system, thus creating a greater stability margin while preserving the response of the force control system. The force compliant mechanisms can prevent a force control system from becoming uncontrollable due to forces exerted by or experienced from active position or force control systems on the same test object. The increased in stability provides greater loop gain, faster operation, and reduced errors. Use of the force compliant mechanism is effective in reducing force transients because the rate of change of the force, which the force control simulation imparts on the test object, is typically low with respect to the rate of change of the test object motion for dynamic load control. The present invention provides the above stated advantages without increased size and with high-energy storage to weight ratio and reduced system costs.

The force compliant mechanisms are also useful in reducing force transients due to vibrations or shocks, and thus provide shock isolation in applications, such as manufacturing machinery, recreational equipment, vehicle suspensions, exercise equipment, as well as other applications. The force compliant mechanisms act as a passive decoupling devices. The force compliant mechanisms may be used as a bicycle seat post, a boat propeller coupling, a dynamometer, a torsion and tension-compression power transfer coupling, a tension compression element with integral damping, a snubbed spring mechanism with cushion at end of travel for stiffness transition, and a combination force and torque sensor. A few other applications include a powertrain delivery mechanism subject to both rotational and translational disturbances and engine mounts.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A force compliant mechanism for a force control system comprising:
   a housing;
   a force compliant spring member disposed within said housing, said force compliant spring member comprising a center section having an inner coupling diameter, an outer peripheral section supported by said housing, and a spiral section connecting said center section to said outer peripheral section; and
   a force actuator input shaft coupled to said force compliant spring member and displacing in response to a force induced thereon,
   wherein said spiral section is formed by machining a spiral cut in a body of material, said spiral cut not extending to said inner coupling diameter of said center section and not extending to an outer peripheral surface of said outer peripheral section.

2. A mechanism as in claim 1 wherein said housing comprises an extension chamber, said center section of said force compliant spring member being displaceable in opposite directions within said extension chamber, and said outer peripheral section of said force compliant spring member being held securely by said housing.

3. A mechanism as in claim 1 wherein said force compliant spring member is tapered on both sides.

4. A mechanism as in claim 1 wherein a pitch of said spiral sections of said force compliant spring member varies.

5. A mechanism as in claim 1 wherein said housing and said force compliant spring member are integrally formed as a single unit.

6. A mechanism as in claim 1 wherein said force compliant spring member comprises:
   a first inner section having a first inner coupling diameter;
   a second inner section having a second inner coupling diameter; and
   a divider between said first section and said second section.

7. A mechanism as in claim 1 wherein said force compliant spring member tapers radially inwardly on both sides, said center section having a width less than said outer peripheral section.

8. A mechanism as in claim 1 wherein said outer peripheral section of said force compliant spring member extends beyond said center section of said force compliant spring member on both sides thereof.

9. A mechanism as in claim 1 wherein said housing comprises first and second plates coupled by a plurality of tie rods.

10. A mechanism as in claim 9 wherein said first plate comprises at least one hole.

\* \* \* \* \*